(12) United States Patent
Gianetti et al.

(10) Patent No.: US 11,952,499 B2
(45) Date of Patent: Apr. 9, 2024

(54) LAYER SEQUENCE WITH COLOUR FLOP EFFECT INCLUDING PLATELET-SHAPED EFFECT PIGMENTS

(71) Applicant: Hubergroup Italia, Bolzano Vicentino (IT)

(72) Inventors: Giuseppe Gianetti, Saronno (IT); Giuseppe Ciriello, Valdagno (IT); Adriano Nicolin, San Pietro in Gu (IT); Tim Salzwedel, Hann. Münden (DE); Lutz Frischmann, Ismaning (DE); Sylvia Klausnitzer, Bruckmühl (DE)

(73) Assignee: Hubergroup Italia, Bolzano Vicentino VI (IT)

( * ) Notice: Subject to any disclaimer, the term of this patent is extended or adjusted under 35 U.S.C. 154(b) by 894 days.

(21) Appl. No.: 16/968,561

(22) PCT Filed: Feb. 11, 2019

(86) PCT No.: PCT/EP2019/053332
§ 371 (c)(1),
(2) Date: Aug. 7, 2020

(87) PCT Pub. No.: WO2019/155068
PCT Pub. Date: Aug. 15, 2019

(65) Prior Publication Data
US 2021/0040328 A1    Feb. 11, 2021

(30) Foreign Application Priority Data
Feb. 12, 2018   (EP) .................................... 18156380

(51) Int. Cl.
*C09C 1/00* (2006.01)
*B05D 5/06* (2006.01)
(Continued)

(52) U.S. Cl.
CPC ............ *C09C 1/0015* (2013.01); *B05D 5/065* (2013.01); *C09D 5/36* (2013.01); *C09D 7/68* (2018.01);
(Continued)

(58) Field of Classification Search
None
See application file for complete search history.

(56) References Cited

U.S. PATENT DOCUMENTS 7,077,897 B2   7/2006   Bruckner et al.
7,169,223 B1   1/2007   Pfaff et al.
(Continued)

FOREIGN PATENT DOCUMENTS

CN   1807521 A      7/2006
CN   101203330 A    6/2008
(Continued)

OTHER PUBLICATIONS

International Search Report in International Application No. PCT/EP2019/053332, dated Apr. 26, 2019.
(Continued)

*Primary Examiner* — Samir Shah
(74) *Attorney, Agent, or Firm* — Hershkovitz & Associates, PLLC; Abe Hershkovitz; Eugene C. Rzucidlo

(57) ABSTRACT

The present invention relates to a system, which comprises: b) at least one first colour layer containing a dye and/or pigment, c) on the at least one first colour layer an effect layer containing at least one platelet-shaped effect pigment, wherein the at least one platelet-shaped effect pigment is composed of particles having an average length of 2 to 500 µm, an average width of 2 to 500 µm and an average thickness of at most 1 µm, and d) on the effect layer at least one second colour layer containing a dye and/or pigment, wherein each of the at least one first colour layer and of the
(Continued)

at least one second colour layer contains a dye and/or pigment being no platelet-shaped effect pigment, wherein the at least one dye and/or at least one pigment included in the at least one first colour layer is different from the at least one dye and/or at least one pigment included in the at least one second colour layer, and wherein, at least if the at least one first colour layer has a sum of reflectance and scattering of less than 40%, the system further comprises: a) below the at least one first colour layer a lower layer containing a pigment and having a sum of reflectance and scattering of at least 40%.

18 Claims, 3 Drawing Sheets

(51) Int. Cl.
| | | |
|---|---|---|
| | *C09D 5/36* | (2006.01) |
| | *C09D 7/40* | (2018.01) |
| | *C09D 11/037* | (2014.01) |
| | *D21H 17/63* | (2006.01) |
| | *D21H 21/28* | (2006.01) |

(52) U.S. Cl.
CPC ............... *C09D 7/69* (2018.01); *C09D 7/70* (2018.01); *C09D 11/037* (2013.01); *D21H 17/63* (2013.01); *D21H 21/285* (2013.01); *C09C 2200/305* (2013.01); *C09C 2200/308* (2013.01)

(56) References Cited

U.S. PATENT DOCUMENTS

| | | |
|---|---|---|
| 7,910,211 B2 | 3/2011 | Avgenaki et al. |
| 2003/0017316 A1 | 1/2003 | Pfaff et al. |
| 2004/0226480 A1 | 11/2004 | Greiwe et al. |
| 2006/0068116 A1 | 3/2006 | Chilla et al. |
| 2008/0248292 A1 | 10/2008 | Chilla et al. |
| 2010/0186891 A1 | 7/2010 | Ruch et al. |
| 2013/0335495 A1 | 12/2013 | Umebayashi |
| 2014/0291495 A1 | 10/2014 | Fischer et al. |
| 2015/0004424 A1 | 1/2015 | Kruesemann et al. |
| 2015/0147493 A1 | 5/2015 | Ruch et al. |
| 2017/0122873 A1 | 5/2017 | Fischer et al. |
| 2017/0291401 A1* | 10/2017 | Yamane ............... C09D 7/70 |

FOREIGN PATENT DOCUMENTS

| | | |
|---|---|---|
| CN | 107000411 A | 8/2017 |
| EP | 2173816 A2 | 4/2010 |
| EP | 2837432 A1 | 2/2015 |
| JP | H0494774 A | 3/1992 |
| JP | 2005307008 A | 11/2005 |
| WO | WO 99/57204 A1 | 11/1999 |
| WO | 2009010521 A2 | 1/2009 |
| WO | WO 2013/154168 A1 | 10/2013 |

OTHER PUBLICATIONS

International Preliminary Report on Patentability in International Application No. PCT/EP2019/053332, dated Mar. 9, 2020.
Written Opinion of the International Search Authority in International Application No. PCT/EP2019/053332, dated Apr. 26, 2019.
Extended European Search Report in related European Patent Application No. EP 18156380.0, dated Aug. 3, 2018.
English language translation of JP 2005307008 A (Nov. 4, 2005).
JP Office Action in JP Patent Application No. 2020-565541, dated Dec. 1, 2022.
English language translation of JP Office Action in JP Patent Application No. 2020-565541, dated Dec. 1, 2022.
CN Office Action in CN Patent Application No. 201980012812.9, dated Aug. 31, 2023.
English language translation of CN Office Action in CN Patent Application No. 201980012812.9, dated Aug. 31, 2023.
CN Office Action and Search Report dated Mar. 3, 2022 in CN Application No. 201980012812.9.
English translation of CN Office Action dated Mar. 3, 2022 in CN Application No. 201980012812.9.
English translation of CN Search Report dated Mar. 3, 2022 in CN Application No. 201980012812.9.
TW Office Action and Search Report dated Mar. 14, 2022 in TW Application No. 108104624.
English translation of TW Office Action and Search Report dated Mar. 14, 2022 in TW Application No. 108104624.
English Abstract of JPH0494774 (A).

* cited by examiner

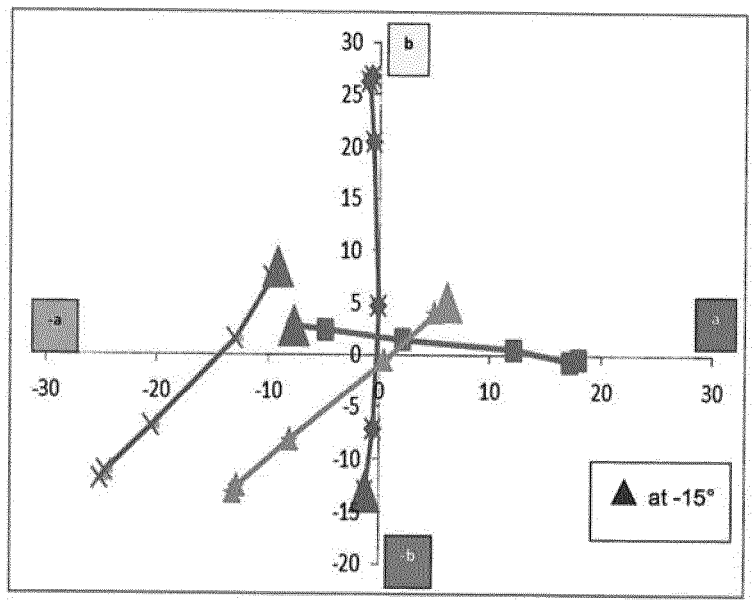
Fig. 3
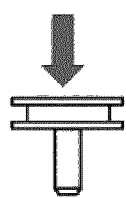 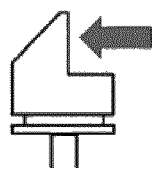 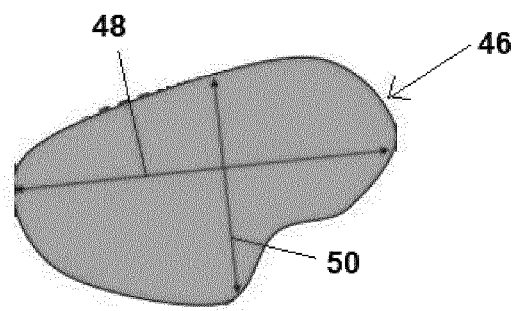
Fig. 4a  Fig. 4b  Fig. 4c

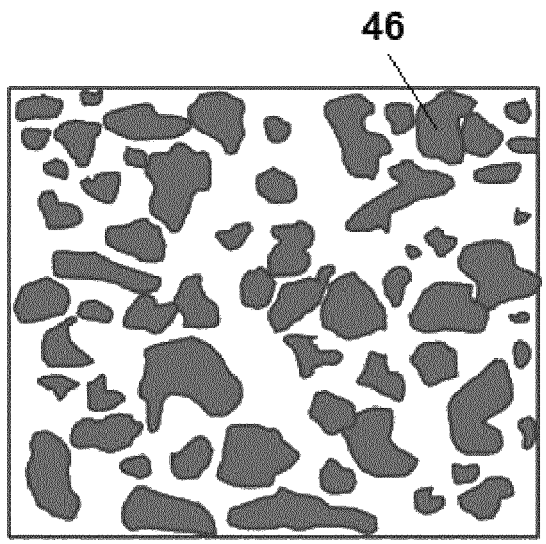
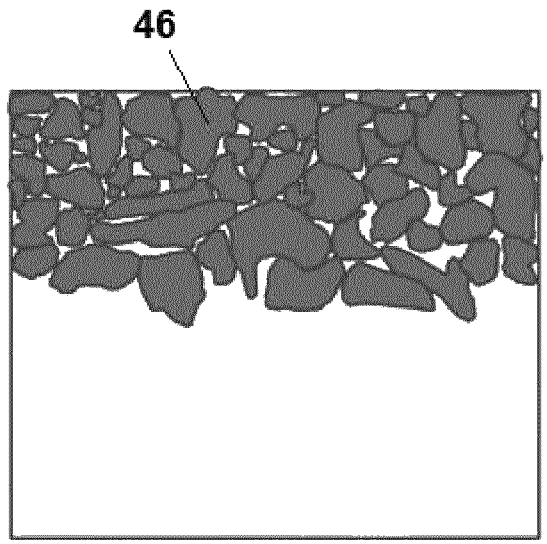
Fig. 5a                    Fig. 5b
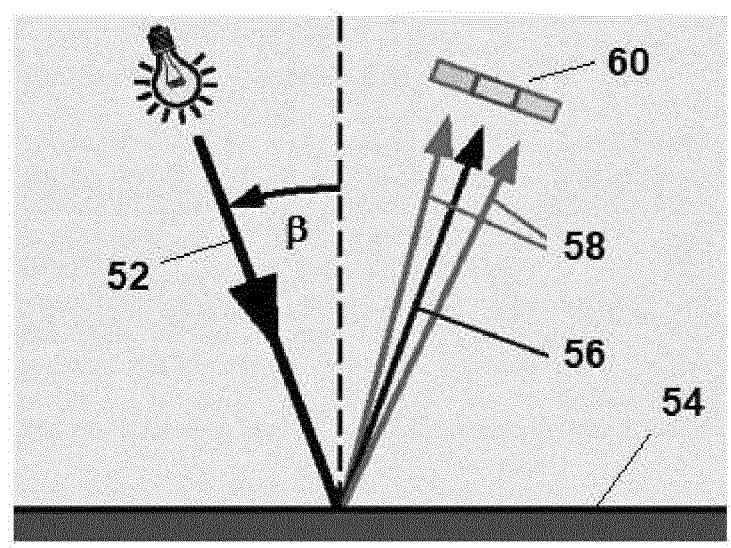
Fig. 6

LAYER SEQUENCE WITH COLOUR FLOP EFFECT INCLUDING PLATELET-SHAPED EFFECT PIGMENTS

The present invention relates to a system, such as a system of layers of inks, films, coatings or lacquers or a system comprising a substrate which is coated with a system of layers of inks, films or lacquers, wherein the system exhibits a colour flop effect, even if the system does not contain any interference pigment.

Systems, such as objects or substrates, respectively, coated for instance with inks, wherein the inks impart a colour flop effect, show a change of a colouristic property under different viewing angles or observation angles, respectively. Such effects are called flop effects or flip-flop effects, respectively. The colouristic property, which changes under different observation angles, may be the brightness or colour shade of the ink. More specifically, a change of the brightness of a printed object in dependency of the observation angle is typically called brightness flop effect, whereas a change of the colour shade of a printed object in dependency of the observation angle is referred to as colour shade flip-flop effect or a colour travel effect.

Inks imparting an object coated therewith with such a flip-flop effect are for instance interesting for coating objects used for safety applications, such as for forgery-proof security papers, such as banknotes, credit cards, postage stamps, telephone cards and identity cards, whereas lacquers imparting an object coated therewith with such a flip-flop effect are for instance interesting for coating automobiles in order to impart them a specific outer appearance.

In order to impart into a system a colour shade flip-flop effect, holographic foils are often used. For the same purpose, also usually interference pigments are added into the ink, lacquer or film, respectively. Such interference pigments comprise at least two different layers, which cause a reflection of parts of the light waves at different planes and a refraction of a part of the light waves, so that the light waves reflected from the different planes travel different distances leading to an interference. Interference is a phenomenon in which two waves superpose to form a resultant wave of greater, lower or the same amplitude. Interference usually refers to the interaction of waves that are correlated or coherent with each other, either because they come from the same source or because they have the same or nearly the same frequency. Interference effects can be observed with all types of waves, for example, light, radio, acoustic, surface water waves or matter waves. Examples for such interference pigments are for instance carrier platelets, such as alumina platelets or silica platelets, which are coated with high-refractive metal oxides, such as with titanium dioxide and iron(III)oxide.

U.S. Pat. No. 7,077,897 B2 describes a multilayer interference pigment for security applications, which consists of a transparent support material which is coated with alternating layers of colourless, non-absorbent metal oxides of high and low refractive indices, with the difference between the refractive indices being at least 0.1. The respective pigment is obtainable by alternate coating of the transparent support material with a metal oxide of high refractive index and a metal oxide of low refractive index by a wet process by hydrolysis of the corresponding, water-soluble, inorganic metal compounds, and separating off, drying and optionally calcining the resultant pigment.

However, known systems based on interference pigments are expensive due to the complex structure of the interference pigments and the laborious production process for synthesizing the interference pigments. Another important disadvantage of known systems based on interference pigments is that each of these inks can only be used for one specific colour shade flip-flop, for example red-green.

In view of this, the object underlying the present invention is to provide a system, such as an ink sequence, lacquer sequence, or a film/foil sequence, which imparts an object coated therewith with a flip-flop effect and particularly a colour shade flip-flop effect and/or with a brightness flip-flop effect, but which is nevertheless cost efficient, because it does not need to include any interference pigment. Moreover, the system shall be easily adjustable for any desired colour shade flip-flop effect and/or brightness flip-flop effect.

In accordance with the present invention, this object is satisfied by providing a system, such as an ink or lacquer sequence, which comprises:

b) at least one first colour layer containing a dye and/or pigment, c) on the at least one first colour layer an effect layer containing at least one platelet-shaped effect pigment, wherein the at least one platelet-shaped effect pigment is composed of particles having an average length of 2 to 500 µm, an average width of 2 to 500 µm and an average thickness of at most 1 µm, and d) on the effect layer at least one second colour layer containing a dye and/or pigment, wherein each of the at least one first colour layer and of the at least one second colour layer contains a dye and/or pigment being no platelet-shaped effect pigment, wherein the at least one dye and/or at least one pigment included in the at least one first colour layer is different from the at least one dye and/or at least one pigment included in the at least one second colour layer, and wherein, at least if the at least one first colour layer has a sum of reflectance and scattering of less than 40%, the system further comprises:

a) below the at least one first colour layer a lower layer containing a pigment and having a sum of reflectance and scattering of at least 40%.

This solution bases on the surprising finding that by arranging an effect layer c) containing at least one platelet-shaped effect pigment being composed of particles having the specific, aforementioned dimensions of average length, of average width and of average thickness between one or more first colour layer(s) b) containing a dye and/or pigment being no platelet-shaped effect pigment and one or more second colour layer(s) d) containing a dye and/or pigment being no platelet-shaped effect pigment, wherein the at least one dye and/or at least one pigment included in the at least one first colour layer is different from the at least one dye and/or at least one pigment included in the at least one second colour layer, wherein the at least one first colour layer b) has a sum of reflectance and scattering of at least 40% and/or wherein a lower layer containing a pigment and having a sum of reflectance and scattering of at least 40% is arranged below the first colour layer b), a system, such as an ink system, a lacquer system, or a film/foil system, is obtained, which shows a colour shade flip-flop effect, i.e. which shows a change of the colour shade in dependency of the observation angle, and/or which shows a brightness flip-flop effect, i.e. which shows a change of the brightness in dependency of the observation angle. In accordance with the present invention, the respective layers are preferably composed so that the delta a/b of the system is at least 15, which characterizes a colour flip-flop effect, and/or so that the delta L of the system is at least 10, which characterizes a brightness flip-flop effect. The parameters a, b and L refer to the CIE L*a*b* colour space, which is standardized in the DIN EN ISO 11664-4 "Colorimetry—Part 4: CIE 1976 L*a*b* colour space", and which describes mathematically all perceivable colours in the three dimensions L for lightness or brightness, respectively, a for the colour opponents green-red and b for the colour opponents green-red and blue-yellow. Since no interference pigments need to be contained, but only standard dyes and pigments, respectively, the system according to the present invention is cost efficient. Moreover, since any known dye and/or pigment may be used for the at least one first colour layer b), for the at least one second colour layer d) and for any possible further optional colour layer, the colour shade effect can be tailored upon desire to a desired colour shade effect. All in all, the present invention allows formulating a system showing any desired colour shade flip-flop effect and/or brightness flip-flop effect. Even different colour shade flip-flops can be realized in different areas on the same substrate.

In order to measure the flip-flop effect, visible light is irradiated in accordance with the present invention on the system (i.e. onto the surface of the uppermost layer of the system) in a dark environment at an incident angle of 46° with regard to the horizontal direction. At least a part of the light is reflected and scattered by the system and the colour of the reflected and scattered light is measured at different viewing angles. Traditionally, a five or six angle colour measurement offers a convenient solution. Examples for the angles at which the colour of the reflected and scattered light is measured are defined further below. Measurements at more or less different angles are also suitable for detection of the colour travel. Besides visual light other standardized light types can be used, e.g. A, C, D50, D65, F2, F7, F11 or F12, wherein D50 is particularly preferred.

In accordance with the present invention, an effect pigment is defined to be composed of platelet-shaped effect pigment particles, which are able to reflect incident light but which do not exhibit any colour shade flop effect, wherein interference pigments are according to the present invention explicitly excluded from the definition of the effect pigment. Interference pigments are typically composed of thin, highly refractive layers, which produce an interference of light waves.

In principle, the present invention is not specifically limited to the kind of effect pigment which is included in the effect layer c), as long as it reflects incident light in a sufficient amount. Preferably, the effect pigment is selected from the group consisting of metal or a mineral. Suitable examples therefore are pigments being composed of silver, gold, aluminium, alloys, such as brass bronzes, copper-zinc alloys and aluminium bronzes, mica, metal oxide doped alpha-iron oxides, such as manganese doped alpha-iron oxides, aluminium oxide doped alpha-iron oxides and silicium dioxide doped alpha-iron oxides, and arbitrary combinations of two or more of the aforementioned substances. More preferably, the effect pigment contained in the effect layer c) is a metallic effect pigment, i.e. an effect pigment composed of metal.

Most preferably, the platelet-shaped effect pigment included in the effect layer c) is a platelet-shaped metallic pigment being composed of particles made of a metal selected from the group consisting of silver, gold, aluminium, copper, brass bronzes, copper-zinc alloys or other alloys, such as Stapa AE 8 NL/80 Aluminium, Metalstar 07 0095 Silver, Aluminium Stapa AE Reflexal Vlll/80, Stapa Reflexal 88 NL/80, Metalstar 06 7000 Silver, Rotoflex XA 6-203 Bleichgold, Rotoflex XA 6-206 Reichbleichgold, Rotoflex XA 6-209 Reichgold, RotoVario 530080 Silver, Rotovario 500 042 Silver, Rotovario 500022 Silber, Hydro Pellet 1300, Rotovario 500001 Silber from Eckart, or Decomet 1010/10, Grandor 4140 Reichgold, Grandor 4140 Reichbleichgold, Grandor 4140 Bleichgold from Schienk, or Silvet ET 2016 from Silberline and arbitrary combinations of two or more of the aforementioned substances.

In addition to the effect pigment, the effect layer c) can also contain one or more non-effect pigments or dyes.

In accordance with the present invention, a platelet-shaped effect pigment is defined to be an effect pigment having an average length of 2 to 500 µm, an average width of 2 to 500 µm and an average thickness of at most 1 µm. Particular good results are obtained, when the platelet-shaped effect pigment is composed of particles having an average length of 2 to 40 µm and more preferably of 2 to 20 µm or of 2 to 500 µm and more preferably of 2 to 100 µm. The particle length is defined in this connection as the longest extension of the particle, whereas average particle length means the average of the lengths of at least 600 measured particles and preferably of at least 1,000 measured particles. For instance, 1,000 of the platelet-shaped effect pigment particles are optically characterized as set out in further detail below, whereby the lengths of the 1,000 particles are determined. Then, the sum of the 1,000 lengths is calculated, which is divided by 1,000.

If the system is prepared by a printing technique, i.e. if the layers of the system are ink layers, the average length of the platelet-shaped effect pigment particles is preferably 2 to 40 µm and more preferably 2 to 20 µm. If the system is prepared by e.g. a spraying technique, i.e. if the layers of the system are coating or lacquer layers, the average length of the platelet-shaped effect pigment particles is preferably 2 to 500 µm and more preferably 2 to 100 µm. The same is preferred when the system is a hybrid system, in which one or more, but not all of the layers are ink layers, whereas the other layers including at least the effect layer c) are coating or lacquer layers. If the system is prepared by laminating foils or films, i.e. if the layers of the system are foil or film layers, the average length of the platelet-shaped effect pigment particles is preferably 2 to 40 µm and more preferably 2 to 20 µm in the respective foil or film layer. Foils are meant in accordance with the present invention to be aluminium foils, whereas films are meant to be plastic films.

In accordance with a further preferred embodiment of the present invention, the platelet-shaped effect pigment is composed of particles having an average width of 2 to 40 µm and more preferably of 2 to 20 µm or of 2 to 500 µm and more preferably of 2 to 100 µm. The particle width is defined in this connection as the longest extension of the particle in the direction being perpendicular to the particle length, whereas average particle width means the average of the widths of at least 600 measured particles and preferably of at least 1,000 measured particles.

If the system is prepared by a printing technique, i.e. if the layers of the system are ink layers, the average width of the platelet-shaped effect pigment particles is preferably 2 to 40 µm and more preferably 2 to 20 µm. If the system is prepared by e.g. a spraying technique, i.e. if the layers of the system are coating or lacquer layers, the average width of the platelet-shaped effect pigment particles is preferably 2 to 500 µm and more preferably 2 to 100 µm. The same is preferred when the system is a hybrid system, in which one or more, but not all of the layers are ink layers, whereas the other layers including at least the effect layer c) are selected from the group consisting of coating and lacquer layers. If the system is prepared by laminating foils or film, i.e. if the layers of the system are foil or film layers, the average width of the platelet-shaped effect pigment particles is preferably 2 to 40 μm and more preferably 2 to 20 μm.

The length and width of particles in general and specifically of platelet-shaped effect pigment particles are measured in accordance with the present invention preferably as follows: For sample preparation, the pigment particles are washed out with acetone, then a few drops of the dispersion of pigment particles in acetone are applied to e.g. a PMMA (polymethyl methacrylate) or glass pane or a mica substrate fixed on a turntable and dried at room temperature. In this way, most of the pigment particles orient themselves parallel to the surface of the substrate. By choosing an appropriate dilution factor, an overlapping of single pigments on the substrate can be avoided and the length and width of the individual pigments can be determined optically. The length and width is then determined optically, preferably by means of scanning electron microscopy, which is performed with a Phenom Pro XL from Thermo Fisher Scientific, Phenom World BV, Eindhoven, The Netherlands, in the measurement modus BSE (back scattered electrons) using a voltage of 15 kV and using a beam current of 1.7 Nanoampere. The particle lengths and widths are then analyzed from the obtained images with the software tool "ParticleMetric" which is included in the software ProSuite distributed by Phenom-World BV, Eindhoven, The Netherlands. More specifically, the images are preferably enlarged so that 20 to 80 particles may be examined. Then the particle length and width are determined for single particles. In order to calculate the average length and width, respectively, as set out above at least 600 and preferably of at least 1,000 particles are measured, then the sum of the measured lengths and width, respectively, is calculated, which is divided by the number of measured particles.

The platelet-shaped effect pigment particles may have a regular cross-sectional form, such as a circular cross-sectional form. However, the platelet-shaped effect pigment particles may have a regular or any irregular cross-sectional form. Irrespective of whether the platelet-shaped effect pigment particles have a regular or irregular cross-sectional form, according to the present invention they may be further characterized by a calculated average diameter. More specifically, the average diameter is calculated according to the equation (L+W)/2, in which L is the average length of the particles and W is the average width of the particles. Preferably, the average diameter of the platelet-shaped effect pigment particles is 2 to 500 μm, more preferably 2 to 40 μm and even more preferably of 2 to 20 μm or 2 to 500 μm and more preferably of 2 to 100 μm, such as 2 to 100 μm or 2 to 50 μm. If the system is prepared by a printing technique, i.e. if the layers of the system are ink layers, the average diameter of the platelet-shaped effect pigment particles is preferably 2 to 40 μm and more preferably 2 to 20 μm. If the system is prepared by e.g. a spraying technique, i.e. if the layers of the system are coating or lacquer layers, the average diameter of the platelet-shaped effect pigment particles is preferably 2 to 500 μm and more preferably 2 to 100 μm. The same is preferred when the system is a hybrid system, in which one or more, but not all of the layers are ink layers, whereas the other layers including at least the effect layer c) are selected from the group consisting of coating, lacquer, film and foil layers. If the system is prepared by laminating foils or films, i.e. if the layers of the system are foil or film layers, the average diameter of the platelet-shaped effect pigment particles is preferably 2 to 40 μm and more preferably 2 to 20 μm.

In a further development of the idea of the present invention, it is proposed that the at least one platelet-shaped effect pigment is composed of particles having an average thickness of 0.01 to at most 1 μm, more preferably of 0.05 to 1 μm and even more preferably of 0.05 to 0.5 μm, in particular when the system is composed of inks. When the system is composed of coatings or lacquers, it is proposed that the at least one platelet shaped effect pigment is composed of particles having an average thickness of 0.01 to 1 μm. The same is preferred when the system is a hybrid system, in which one or more, but not all of the layers are ink layers, whereas the other layers including at least the effect layer c) are coating or lacquer layers. The particle thickness is defined in this connection as the shortest extension of the particle in the direction being perpendicular to the two-dimensional plane being defined by the particle length and the particle width, whereas average particle thickness means the average of the thicknesses of at least 600 measured particles and preferably of at least 1,000 measured particles. These numbers for the particle thickness apply to all systems based on inks, coatings, lacquers, films and foils.

The thickness of particles in general and specifically of platelet-shaped effect pigment particles is measured in accordance with the present invention preferably as follows: A resin commonly used in electron microscopy, for example TEMPFIX distributed by Gerhard Neubauer Chemikalien, Münster, Germany, is applied to a sample plate and heated on a heating plate until softened. Subsequently, the sample plate is removed from the heating plate and the respective pigment particles are sprinkled or spread onto the softened resin. The resin becomes solid again as it cools and the pigment particles arrange—due to the interplay between adhesion and gravity—almost vertically and are fixed on the sample plate. This makes it easy to measure the pigments laterally in the electron microscope. The resulting sample is placed on a sample holder and scanning electron microscopy is performed with a Phenom Pro XL from Thermo Fisher Scientific, Phenom World BV, Eindhoven, The Netherlands, in the measurement modus BSE (back scattered electrons) using a voltage of 15 kV and using a beam current of 1.7 Nanoampere. The particle thicknesses are then analyzed from the obtained images with the software tool "ParticleMetric" which is included in the software ProSuite distributed by Phenom-World BV, Eindhoven, The Netherlands. More specifically, the images are preferably enlarged so that 20 to 80 particles may be examined. Then the thickness of the particles is determined for single particles. When determining the thickness, the azimuthal angle α of the pigment particle to a plane normal to the surface is estimated and is taken into account when evaluating the thickness according to the formula $T_{eff}=T_{mess}/\cos \alpha$, in which T is the particle thickness. For determining the average thickness, as set out above, the thicknesses of at least 600 measured particles and preferably of at least 1,000 measured particles are measured, the obtained values are summarized and the sum is divided by the number of evaluated particles.

The length, width and thickness of the particles in the final layer system may be determined accordingly. More specifically, several sample pieces having each for instance an area of about 1 $cm^2$ may be cut out of the layer system for example with a laser. The samples may then be embedded in a resin common for electron microscopy, such as embedding media like epoxy resins, e.g. Araldite 502 or 6005, supplied by Electron Microscopy Sciences, Hatfield, Pennsylvania. Thereafter, one or more microtome longitudinal sections of the layer of the system to be analyzed and/or one or more microtome cross-sections of the layer of the system to be analyzed may be made, each of the sections having for instance a thickness of 5 mm. The microtome section(s) may be prepared for instance by using a motorized commercial rotary microtome of type RM 2155 available from Leica Mikrosysteme, Bensheim, Germany. Prior to sectioning, the desired thickness is set and then, the respective metal panels are fixed and in the actual operational step, the rotary microtome is run over the respective sample. Subsequently, the sample(s) are fixed on a sample holder. For example, the longitudinal section(s) may be fixed on sample holder shown in FIG. 4a and cross-sections may be fixed on sample holder shown in FIG. 4b. With each of the resulting thin sections scanning electron microscopy is performed and the particle length, particle width, particle thickness, average particle length, average particle width and average particle thickness are determined as described above.

In accordance with a further preferred embodiment of the present invention, the at least one platelet-shaped effect pigment is composed of particles having a first aspect ratio of the average particle length divided by the average particle width of 1 to 20 and preferably of 1 to 2 or of 2 to 5. These numeric value ranges are preferred for all systems, i.e. for on inks, coatings, lacquers, and films.

In addition, it is preferred that the at least one platelet-shaped effect pigment is composed of particles having a second aspect ratio of the average particle length divided by the average particle thickness of 1 to 75,000, preferably of 1 to 1,000, more preferably of 1 to 200, even more preferably of 1 to 100 and most preferably of 1 to 60. Such metal effect pigments are mostly oriented so that their two-dimensional plane being defined by the particle length and the particle width is oriented basically parallel to the longitudinal section of the effect layer.

It is proposed in a further development of the idea of the present invention that the average particle area ratio of the effect layer c) is 5 to 75%, more preferably 10 to 55% and most preferably 15 to 35%. The average particle area ratio of the effect layer c) means in accordance with the present invention the sum of the area in the longitudinal section of the effect layer c) which is covered by the platelet-shaped effect pigment particles divided by the total area of the longitudinal section of the effect layer. The measurement principle is shown in FIGS. 5a and 5b.

The average particle area ratio of any of the single layers and particularly of the effect layer is measured in accordance with the present invention preferably by scanning electron microscopy from the surface of the concerned layer of the system being prepared as described above or from a longitudinal section of the concerned layer of the system being prepared as described above. The particles are colored with the software tool "ParticleMetric" and then the sum of the area in the longitudinal section which is covered by particles is evaluated and divided by the total area of the longitudinal section analyzed by scanning electron microscopy so as to obtain the average particle area ratio in percent.

In accordance with a further preferred embodiment of the present invention, the effect layer c) of the system in accordance with the present invention has an average thickness of 0.1 to 50 µm, more preferably of 0.1 to 30 µm and most preferably of 0.2 to 20 µm, in particular when the system is composed of inks, or films. When the system is composed of coatings or lacquers, the effect layer c) of the system in accordance with the present invention has an average thickness of 0.1 to 150 µm, more preferably of 1 to 100 µm and even more preferably of 10 to 50 µm. The same is preferred when the system is a hybrid system, in which one or more, but not all of the layers are ink layers, whereas the other layers including at least the effect layer c) are coatings or lacquer layers.

Preferably, the effect layer c) of the system in accordance with the present invention contains, preferably in case it is an ink layer, a coating or a lacquer layer, depending on the effect layer thickness, the viscosity and the application method, 10 to 95% by weight of binder based on the total weight of the composition applied to form the effect layer, wherein the binder is preferably selected from the group consisting of polyesters, polyethers, polyurethanes, polyamides, polyacrylates, maleinate resins, collophonium resins, ketone resins, aldehyde resins, alkyd resins, collophonium modified phenolic resins, hydrocarbon resins, silicates, silicones, phenolic resins, urea resins, melamine resins, epoxy resins, polyterpene resins, shellac, copal, dammar, lignin derivatives, natural resins, poly-vinylalcohols, polyvinylether, polyvinylacetates, polyvinylchloride, polyvinylethers, polyvinylpropionates, polyvinyl butyrates, polymethacrylates, polystyrenes, polyolefines, hydrocarbon resins, coumarone-indene resins, aromatic formaldehyde resins, carbamide acid resins, sulfonamide resins, chlorinated resins, nitrocellulose, CAB (cellulose acetate butyrate), CAP (cellulose acetate propionate), cellulose compounds, rubbers, polysaccharides, radiation curing resins, temperature curing resins and arbitrary combinations of two or more of the aforementioned binders.

In addition to the binder or instead of the binder, the effect layer c) may contain, depending on the nature and the viscosity of the ink and the application method, more than 0 to 95% by weight of solvent based on the total weight of the composition applied to form the effect layer c). Good results are in particular obtained, when the solvent is selected from the group consisting of mineral oils, vegetable oils, fatty acid esters, alcohols, esters, ethers, glycols, water, cyclic or linear hydrocarbons, ketones, lactones, alkanes, aromatic hydrocarbons, monomers and oligomers with hydroxy, carboxy, alkoxy, amino, acrylic or vinyl functionality aromatic compounds and arbitrary combinations of two or more of the aforementioned solvents.

Furthermore, the effect layer c) may contain one or more additives. Examples for such additives are those selected from the group consisting of rheological additives, adhesives, defoamers, slip additives, anti-corrosion additives, gloss additives, waxes, wetting agents, curing agents, chelating agents, photoinitiators, inhibitors, desiccants, stabilizers, emulsifiers, pH adjustment additives, abrasions resistance additives, plasticizers, antistatic additives, preservatives, light protection agents, matting agents, fillers and arbitrary combinations of two or more of the aforementioned additives.

It has been found within the present invention that the degree of the obtained flip-flop effect of the system is influenced, if the system is an ink system, by the ink coverage. If the system is an ink system, it is preferred that the ink coverage of the dry effect layer c) on the at least one first colour layer b), i.e. on the uppermost of the first colour layer(s), is 25 to 100%, more preferably 40 to 100%, even more preferably 50 to 100% and most preferably 60 to 100%. The ink coverage is the percentage of the area of the uppermost of the first colour layer(s), which is covered by the effect layer c). Ink coverage refers to the real area coverage when halftones are printed. Likewise to this, it is preferred that the ink coverage of the dry effect layer c) on the substrate is 25 to 100%, more preferably 40 to 100%, even more preferably 50 to 100% and most preferably 60 to 100%.

If the system is a lacquer system, a coating, or a film/foil system, the coverage of the effect layer c) on the at least one first colour layer b), i.e. on the uppermost of the first colour layer(s), is complete, i.e. 100% or at least 90%. Anyway, the effect layer c) completely covers the at least one first colour layer b). Likewise to this, it is preferred that the effect layer c) completely covers the substrate.

In a further development of the idea of the present invention, it is proposed that the grammage of the dry effect layer c) is 0.2 to 15 gsm, more preferably 0.3 to 10 gsm and most preferably 0.4 to 7.5 gsm, particularly when the system is composed of inks. When the system is a coatings or lacquer system, the dry laydown of the effect layer c) is 0.1 to 60 gsm and more preferably 1 to 30 gsm and even more preferably 1 to 20 gsm. The same is preferred when the system is a hybrid system, in which one or more, but not all of the layers are ink layers, whereas the other layers including at least the effect layer c) are coating, lacquer or film layers.

In addition, it is preferred that the weight ratio of pigment to binder in the dry effect layer is 0.02:1 to 2:1, more preferably 0.1 to 2:1 and even more preferably 0.2:1 to 1.8:1. More specifically, it is preferred that the weight ratio of pigment to binder in the dry effect layer c) is 0.3:1 to 2:1, more preferably 0.7:1 to 2:1 and most preferably 0.7:1 to 1.8:1, when the system is composed of inks. When the system is composed of lacquers or coatings, it is preferred that the weight ratio of pigment to binder in the dry effect layer c) is 0.02:1 to 2:1, more preferably 0.2:1 to 1.5:1 and most preferably 0.2:1 to 1:1. The same is preferred when the system is a hybrid system, in which one or more, but not all of the layers are ink layers, whereas the other layers including at least the effect layer c) are coating, lacquer or film/foil layers.

In a further development of the idea of the present invention, it is proposed that the effect layer c) of the system in accordance with the present invention is an ink, or a film/foil system, which contains 10 to 70% by weight, preferably 20 to 70% by weight, still preferably 30 to 70% by weight and more preferably 40 to 70% by weight of platelet-shaped effect pigment based on the total weight of the dry effect layer. When the system is a coatings or lacquer system, it is preferred that the effect layer contains 1 to 30% by weight and more preferably 2 to 25% by weight of platelet-shaped effect pigment based on the total weight of the dry effect layer. The same is preferred when the system is a hybrid system, in which one or more, but not all of the layers are ink layers, whereas the other layers including at least the effect layer c) are coating, lacquer or film/foil layers. It is particularly preferred that the effect layer c) comprises the aforementioned contents of platelet-shaped metallic effect pigment.

Furthermore, it is preferred that the effect layer c) of the system in accordance with the present invention has a sum of reflectance and scattering of 20 to 100%, more preferably of 30 to 100% and most preferably of 40 to 100%.

The sum of reflectance and scattering of a layer, such as of the effect layer, is measured in accordance with the present invention preferably by using a Haze-Gloss instrument from Byk Garnder, Geretsried, Germany. A piece of the prepared layer with or without being attached to other layers and having for instance an area of 10 cm$^2$ is cut out of the system and placed in the apparatus. Norm light D65 is irradiated in defined angle, e.g. 20°, 60° or 85° and preferably 20°, from the vertical direction onto the surface of the layer to be analyzed and the reflected (which corresponds to gloss, as described in DIN 67530) as well as the scattered light (which corresponds to haze) is detected. The measurement principle is shown in FIG. 6.

In accordance with the present invention, the system necessarily comprises below the at least one first colour layer b) a lower layer a), which may but must not contain a pigment, and having a sum of reflectance and scattering of at least 40%, if the at least one first colour layer b) has a sum of reflectance and scattering of less than 40%, whereas the lower layer a) may be present or not, if the at least one first colour layer b) has a sum of reflectance and scattering of at least 40%. If more than one first colour layer b) is present, the formulation that "the at least one first colour layer b) has a sum of reflectance and scattering of less than 40%" means that the assembly of all first colour layers b) has a sum of reflectance and scattering of at least 40%.

Preferably, the lower layer a) is present and has a sum of reflectance and scattering of at least 50%, preferably of at least 60%, more preferably of at least 70%, still more preferably of at least 80% and most preferably of at least 90%.

In principle, the present invention is not specifically limited to the kind of pigment, which is included in the lower layer a), as long as it has good reflectance and scattering properties. However, good results are in particular obtained, when the lower layer a) contains a white pigment and more preferably a white pigment being selected from the group consisting of titanium dioxide, barium sulfate, zinc oxide, zinc sulfide, lead carbonate, calcium carbonate, aluminium oxide, aluminium silicate and arbitrary combinations of two or more of the aforementioned substances.

For instance, the lower layer a) may be the substrate, onto which the system is coated, if the substrate is one with a sum of reflectance and scattering of at least 40%, such as a respective high reflecting paper, cardboard, foil, white film, white glass, white textile, white nonwoven, white silicone substrate, white ceramic substrate, white mineral substrate or white wood substrate. Otherwise, the lower layer a) is a layer between the substrate and the at least one first colour layer b).

In accordance with a first particularly preferred embodiment of the present invention, the lower layer a) is a white film. In this embodiment, the lower layer a), i.e. the film, preferably contains 0.1 to 10% by weight, more preferably 0.25 to 4% by weight and still more preferably 0.75 to 1.5% by weight of white pigment based on the total weight of the lower layer a). Good results are in particular obtained, when the film has a thickness of preferably 1 to 100 μm, more preferably of 2 to 50 μm and most preferably of 10 to 30 μm. Thicker films or even plastic boards or moulds are also most suitable.

In accordance with a second particularly preferred embodiment of the present invention, the lower layer a) is a paper. In this embodiment, the lower layer a), i.e. the paper, preferably contains 1 to 50% by weight, more preferably 1 to 10% by weight and still more preferably 3 to 7% by weight of white pigment based on the total weight of the lower layer a). Good results are in particular obtained, when the paper has a thickness of at least 10 μm. Thicker papers or even cardboards are also most suitable.

In accordance with a third particularly preferred embodiment of the present invention, the lower layer a) is an ink, an enamel, a coating or a lacquer. In this embodiment, the lower layer a), i.e. the ink, enamel, coating or lacquer, preferably contains 10 to 90% by weight and preferably 30 to 90% by weight of white pigment based on the total weight of the dry lower layer a). Good results are in particular obtained, when the ink, enamel, coating or the lacquer has a thickness of preferably 1 to 10,000 µm, wherein in the case of an ink a thickness of 0.5 to 100 µm is particularly preferred, in the case of an enamel, coating or lacquer a thickness of 0.5 to 1,000 µm and more preferably 0.5 to 500 µm is particularly preferred and in the case of an enamel a thickness of 0.1 to 2 mm is particularly preferred.

Preferably, the lower layer a) is present and the dye and/or pigment included in each of the at least one first colour layer b) and of the at least one second colour layer d) is different from the pigment contained in the lower layer a).

Particularly good results are obtained, when the white pigment included in the lower layer a) is titanium oxide and most preferably rutile. In this embodiment, the titanium oxide and preferably rutile is present in the form of particles having an average $d_{50}$ particle size of 0.1 to 50 µm, preferably of 0.1 to 10 µm and more preferably of 0.2 to 1 µm. If the lower layer a) is a thicker substrate like cardboard or glass, the pigment particles can be bigger; for thin films, white inks and coatings a smaller particle size is more preferred.

The remainder of the lower layer a) preferably in case the lower layer a) is an ink layer, a lacquer or enamel may be composed of binder, solvent, and/or additives.

Preferably, in case the lower layer a) of the system in accordance with the present invention is an ink layer, a coating or a lacquer layer, it contains, depending on the ink film thickness and the type of ink, 10 to 90% by weight of binder based on the total weight of the liquid ink, coating, lacquer or enamel that forms lower layer a). In the case that the lower layer a) is enamel, the enamel preferably consists of silicates and oxides. The present invention is not particularly limited concerning the kind of binder included in the lower layer a). However, it is preferred that the binder is selected from the group consisting of polyesters, polyethers, polyurethanes, polyamides, polyacrylates, maleinate resins, collophonium resins, ketone resins, aldehyde resins, alkyd resins, collophonium modified phenolic resins, hydrocarbon resins, silicates, silicones, phenolic resins, urea resins, melamine resins, epoxy resins, polyterpene resins, shellac, copal, dammar, lignin derivatives, natural resins, poly-vinylalcohols, polyvinylether, polyvinylacetates, polyvinylchloride, polyvinylethers, polyvinylpropionates, polyvinylbutyrates, polymethacrylates, polystyrenes, polyolefines, hydrocarbon resins, coumarone-indene resins, aromatic formaldehyde resins, carbamide acid resins, sulfonamide resins, chlorinated resins, nitrocellulose, CAB (cellulose acetate butyrate), CAP (cellulose acetate propionate), cellulose compounds, rubbers, polysaccharides, radiation curing resins, temperature curing resins and arbitrary combinations of two or more of the aforementioned binders.

In addition to the binder or instead of the binder, the composition applied to form the lower layer a) of the system in accordance with the present invention may contain more than 0 to 95% by weight of solvent, based on the total weight of the liquid inks, coating, lacquer or enamel used to form lower layer a). The solvent amount depends on the ink system, the application and the pigment content. Good results are in particular obtained, when the solvent is selected from the group consisting of mineral oils, vegetable oils, fatty acid esters, alcohols, esters, ethers, glycols, water, cyclic or linear hydrocarbons, ketones, lactones, alkanes, aromatic hydrocarbons, monomers and oligomers with hydroxy, carboxy, alkoxy, amino, acrylic or vinyl functionality, aromatic compounds and arbitrary combinations of two or more of the aforementioned solvents.

Furthermore, the liquid ink, coating, lacquer or enamel used to form lower layer a) may contain one or more additives. Examples for such additives are those selected from the group consisting of rheological additives, adhesives, defoamers, slip additives, anti-corrosion additives, gloss additives, waxes, wetting agents, curing agents, chelating agents, photoinitiators, inhibitors, desiccants, stabilizers, emulsifiers, pH adjustment additives, abrasions resistance additives, plasticizers, antistatic additives, preservatives, light protection agents, matting agents, fillers and arbitrary combinations of two or more of the aforementioned additives.

The at least one first colour layer b) may have a sum of reflectance and scattering of less than 40% or of at least of at least 40%. As set out above, if the at least one first colour layer b) has a sum of reflectance and scattering of less than 40%, then the system necessarily comprises the lower layer a), whereas the lower layer a) is optional, i.e. may be present or not, if the at least one first colour layer b) has a sum of reflectance and scattering of at least 40%.

If the at least one first colour layer b) has a sum of reflectance and scattering of at least 40%, the sum of reflectance and scattering of the at least one first colour layer b) is more preferably at least 50%, even more preferably at least 60%, still more preferably at least 70%, even more preferably at least 80%, still more preferably at least 90% and most preferably at least 99%.

In accordance with the present invention, the at least one dye and/or at least one pigment included in the first colour layer b) is different from the at least one dye and/or at least one pigment included in the at least one second colour layer d). This leads to a particularly distinct flip-flop effect. In particular, it is preferred that at least one dye and/or at least one pigment included in the first colour layer b) has a different colour or colour shade, respectively, and/or a different lightness than at least one dye and/or at least one pigment included in the at least one second colour layer d), i.e. the colour shade and/or lightness of the first colour layer b) is different to the colour shade and/or lightness of the one second colour layer d).

In accordance with another particular preferred embodiment of the present invention, any of the first colour layer b) and of the at least one second colour layer d) of the system in accordance with the present invention contains 0.001 to 5% by weight of at least one dye and/or 0.1 to 60% by weight or preferably 0.1 to 50% by weight of at least one pigment being no platelet-shaped effect pigment and preferably also no white pigment, based on the total dry weight of the first colour layer b) and the second colour layer d), respectively. The pigments are preferably organic or inorganic pigments with a specific colour. Each of the at least one first colour layer b) as well as each of the at least one second colour layer d) may comprise one or more white pigments and/or one or more platelet-shaped (effect) pigments and/or fillers in addition to that/those pigment(s) being no white pigment and no platelet-shaped effect pigment. However, it is preferred that each of the at least one first colour layer b) as well as each of the at least one second colour layer d) does not comprises any platelet-shaped effect pigment as well as not any white pigment.

In a further development of the idea of the present invention it is proposed that the at least one first colour layer b) has a higher pigment content than the at least one second colour layer d).

When the system is a coatings or lacquer system, it is preferred, that the pigment content in the at least one dry second colour layer d) is 2 to 30%, more preferably 2 to 25% and most preferably 2-20%. When the system is an ink system, it is preferred, that the pigment content in the at least one dry second colour layer d) is 0.1 to 50%, more preferably 1 to 50% and most preferably 2 to 50%.

It is suggested in a further development of the present invention that the second colour layer d) and, if more than one second colour layer d) is present, the assembly of all second colour layers d) has a sum of reflectance and scattering of 1 to 80%, more preferably of 5 to 60% and most preferably of 5 to 40%.

Also particularly any of the inks, coatings or lacquers used to form the first colour layer b) and of the at least one second colour layer d) preferably contains, depending on the ink, coating or lacquer system, the viscosity and the application method, 10 to 99.9% by weight of binder based on the total weight of the first colour layer b) and of the at least one second colour layer d), wherein the binder is preferably selected from the group consisting of polyesters, polyethers, polyurethanes, polyamides, polyacrylates, maleinate resins, collophonium resins, ketone resins, aldehyde resins, alkyd resins, collophonium modified phenolic resins, hydrocarbon resins, ins, silicates, silicones, phenolic resins, urea resins, melamine resins, epoxy resins, ins, polyterpene resins, shellac, copal, dammar, lignin derivatives, natural resins, polyvinylalcohols, polyvinylether, polyvinylacetates, polyvinylchloride, polyvinylethers, polyvinylpropionates, polyvinyl butyrates, polymethacrylates, polystyrenes, polyolefines, hydrocarbon resins, coumarone-indene resins, aromatic formaldehyde resins, carbamide acid resins, sulfonamide resins, chlorinated resins, itrocellulose, CAB (cellulose acetate butyrate), CAP (cellulose acetate propionate), cellulose compounds, rubbers, polysaccharides, radiation curing resins, temperature curing resins and arbitrary combinations of two or more of the aforementioned binders.

In addition to the binder or instead of the binder, any of the inks, coatings or lac-quern used to form the first colour layer b) and of the at least one second colour layer d) of the system in accordance with the present invention may contain, depending on the ink, coating or lacquer system, the viscosity and the application method, more than 0 to 90% by weight of solvent based on the total weight of the liquid ink, coating or lacquer used to form the first colour layer b) and/or of the liquid ink(s), coating(s) or lacquer(s) used to form the at least one second colour layer d), wherein the solvent is preferably selected from the group consisting of mineral oils, vegetable oils, fatty acid esters, alcohols, esters, ethers, glycols, water, cyclic or linear hydrocarbons, ketones, lactones, alkanes, aromatic hydrocarbons, monomers and oligomers with hydroxy, carboxy, alkoxy, amino, acrylic or vinyl functionality, aromatic compounds and arbitrary combinations of two or more of the aforementioned solvents.

Furthermore, also any of the liquid inks, coatings or lacquers used to form the first colour layer b) and of the at least one second colour layer d) of the system in accordance with the present invention may contain one or more additives. Examples for such additives are those selected from the group consisting of rheological additives, adhesives, defoamers, slip additives, anti-corrosion additives, gloss additives, waxes, wetting agents, curing agents, chelating agents, photoinitiators, inhibitors, desiccants, stabilizers, emulsifiers, pH adjustment additives, abrasions resistance additives, plasticizers, antistatic additives, preservatives, light protection agents, matting agents, fillers and arbitrary combinations of two or more of the aforementioned additives.

Preferably, the system includes 1 to 3, more preferably 1 or 2 and most preferably 1 first colour layer(s) b) below the effect layer c).

In accordance with a further preferred embodiment of the present invention, the system includes 1 to 3 and more preferably 1 or 2 second colour layers d) on/above the effect layer c).

It is particularly preferred that the first colour layer(s) b) are arranged in direct contact with the effect layer c) and, if present, with the lower layer a), i.e. that there is no intermediate layer between the first colour layer b) and the effect layer c) and no intermediate layer between the first colour layer b) and the lower layer a), if present. In case of more than one first colour layer b), the uppermost colour layer is in direct contact with the effect layer c) and the lowest first colour layer b) is in direct contact with the lower layer a), if present, wherein all the colour layers b) are arranged in direct contact with each other one above another. These embodiments are particularly preferred, if the system is an ink system, a coating system or a lacquer system. If the system is a foil/film system, then one or more adhesive layers may be present between one or more of the layers a), b), c) and d).

Likewise to this, it is particularly preferred that the second colour layer(s) d) are arranged in direct contact the effect layer c), i.e. that there is no intermediate layer between the effect layer c) and the second colour layer b). In case of more than one second colour layer d), the lowest colour layer d) is preferably in direct contact with the effect layer c), wherein all the colour layers d) are preferably arranged in direct contact with each other one above another. These embodiments are particularly preferred, if the system is an ink system, a coating system or a lacquer system. If the system is a foil/film system, then one or more adhesive layers may be present between one or more of the layers.

In a further development of the idea of the present invention the at least one first dry colour layer b) and/or the at least one second dry colour layer d) has a thickness of 0.3 to 100 μm, preferably of 0.5 to 10 μm and more preferably of 1 to 10 μm, particularly if the system is an ink system. If more than one first colour layer b) is contained, then preferably the sum of the thicknesses of all first colour layers b) is 0.3 to 100 μm and more preferably of 0.5 to 10 μm. Likewise thereto, if more than one second colour layer d) is contained, then preferably the sum of the thicknesses of all dry second colour layers d) is 0.3 to 100 μm and more preferably of 0.5 to 10 μm. When the system is a coatings or lacquer system, the at least one first dry colour layer b) has a thickness of 1 to 500 μm. If more than one first colour layer b) is contained, then preferably the sum of the thicknesses of all dry first colour layers b) is 1 to 500 μm. The at least one second dry colour layer d) has preferably a thickness of 10 to 80 μm, more preferably of 10 to 70 μm and still more preferably of 10 to 50 μm. If more than one second colour layer d) is contained, then preferably the sum of the thicknesses of all dry second colour layers d) is 10 to 80 μm, more preferably of 10 to 70 μm and most preferably of 10 to 50 μm.

If the system is an ink system, particularly good results are obtained, when the ink coverage of each of the at least one first colour layers b) on the lower layer a), if present, or on the substrate, respectively, is 50 to 100%, more preferably 75 to 100% and most preferably 90 to 100%. Also, it is preferred that the ink coverage of the sum of all of the at least one first colour layers b) on the lower layer a), if present, or on the substrate, respectively, is, if the system is an ink system, 50 to 200%, more preferably 50 to 150% and most preferably 50 to 100%.

If the system is a coating system, a lacquer system, or a film/foil system, the coverage of the sum of all of the at least one first colour layers b) on the lower layer a), if present, or on the substrate, respectively, is complete, i.e. 100% or at least 95%.

Likewise thereto, it is preferred that the ink coverage of each of the at least one second colour layers d) on the effect layer c) is 10 to 90%, more preferably 30 to 80% and most preferably 40 to 60%. Also, it is preferred that the ink coverage of the sum of all of the at least one second colour layers d) on the effect layer c) is 30 to 200% and more preferably 60 to 180%.

If the system is a coating system, a lacquer system, or a film/foil system, the coverage of the sum of all of the at least one second colour layers d) on the effect layer c) is complete, i.e. 100% or at least 95%.

Apart from the above described layers, the system may comprise one or more further layers. For instance, the system may comprise above the at least one second colour layer (d) a second effect layer and above that at least one third colour layer. The at least one third layer is in principle composed likewise to the at least one first colour layer b) and to the at least one second colour layer d), i.e. the at least one third colour layer contains at least one dye and/or pigment, the dye and/or pigment being no platelet-shaped effect pigment. It is preferred in this embodiment that the at least one dye and/or at least one pigment included in the third colour layer is different from the at least one dye and/or at least one pigment included in the at least one first colour layer as well as different from the at least one dye and/or at least one pigment included in the at least one second colour layer. Thus, the at least one third colour layer has a different colour or colour shade, respectively, and/or lightness than at least one dye and/or at least one pigment included in the at least one first colour layer b) and also has a different colour or colour shade, respectively, and/or lightness than at least one dye and/or at least one pigment included in the at least one second colour layer d), i.e. the colour shade and/or lightness of the at least one third colour layer is different to the colour shade and/or lightness of the first and second colour layers b) and d).

In particular, if the system is a coating system or a lacquer system, such as a coating for an automobile coating, it is preferred that above the uppermost second colour layer d), or above the uppermost third colour layer, if present, a layer of clear lacquer is arranged for protecting the system against mechanical impacts and degradation. Any known clear lacquer may be used for this purpose, such as one or two component clear coats. Merely exemplarily, the clear coat may contain as binder acrylates, polyesters, polyurethanes, all OH-functional in case of 2 components systems or mixtures thereof. In addition, it may contain as solvent water or organic solvents, as hardener two-or polyfunctional isocyanates or amines and as additives, rheological additives, adhesives, defoamers, slip additives, plasticizers, anti-corrosion additives, gloss additives, waxes, wetting agents, curing agents, chelating agents, photoinitiators, inhibitors, desiccants, stabilizers, emulsifiers, pH adjustment additives, abrasions resistance additives, antistatic additives, preservatives, light protection agents, matting agents and arbitrary combinations of two or more of the aforementioned additives. The thickness of this clear lacquer layer is preferably at least 50 µm.

In particular, if the system is an ink system, such as e.g. an ink system for packaging applications, it may be preferred that above the uppermost second colour layer d) or above the uppermost third colour layer, if present, an overprint lacquer is arranged for protecting the system against mechanical impacts and to adjust gloss level. Such an overprint lacquer may be a one or two component system and may contain as binders polyesters, polyethers, polyurethanes, polyamides, polyacrylates, maleinate resins, collophonium resins, ketone resins, aldehyde resins, alkyd resins, collophonium modified phenolic resins, hydrocarbon resins, silicates, silicones, phenolic resins, urea resins, melamine resins, epoxy resins, polyterpene resins, shellac, copal, dammar, lignin derivatives, natural resins, polyvinylalcohols, polyvinylether, polyvinylacetates, polyvinylchloride, polyvinylethers, polyvinyl propionates, polyvinyl butyrates, polymethacrylates, polystyrenes, polyolefines, hydrocarbon resins, coumarone-indene resins, aromatic formaldehyde resins, carbamide acid resins, sulfonamide resins, chlorinated resins, nitrocellulose, CAB (cellulose acetate butyrate), CAP (cellulose acetate propionate), cellulose compounds, rubbers, polysaccharides, radiation curing resins, temperature curing resins and arbitrary combinations of two or more of the aforementioned binders, and may contain as solvents mineral oils, vegetable oils, fatty acid esters, alcohols, esters, ethers, glycols, water, cyclic or linear hydrocarbons, ketones, lactones, alkanes, aromatic hydrocarbons, monomers and oligomers with hydroxy, carboxy, alkoxy, amino, acrylic or vinyl functionality aromatic compounds and arbitrary combinations of two or more of the aforementioned solvents as solvents, and may contain as hardener two-or poly-functional isocyanates, amines or photoinitiators.

In addition, it is preferred that the system does not comprise (except possible adhesive layer(s)) between the lower layer a) and the effect layer c) any further layer in addition to the at least one first colour layer b). Moreover, it is also preferred that above the effect layer c) (except possible adhesive layer(s)) only the at least one second colour layer d) and optionally one or more further colour layers and/or unpigmented overprint lacquers and/or coatings are arranged.

As set out above, a particular advantage of the present invention is that a flip-flop effect is obtained, even without incorporating any interference pigment into any layer of the system. Accordingly, in accordance with the present invention the system, i.e. the aforementioned layers a) to d), does not contain any interference pigment.

The flip-flop effect can be calculated with the colour data measured at different viewing angles. For this calculation the measured a and b values that refer to the L*a*b* colour space (CIELAB) can be used. The L*a*b* colour space describes mathematically all perceivable colours in the three dimensions L for lightness and a and b for the colour opponents green-red and blue-yellow. The colour travel can be described as delta a/b between measurements at different viewing angles. Another suitable colour space for investigation of colour travel is the HCL (Hue-Chroma-Luminescence) colour space. HCL uses the CIELAB model defined by the International Commission on Illumination (CIE) in 1976, translated into polar coordinates. The L axis is the same as in the CIELAB system, but ab are transformed into polar coordinates, where the distance from zero is the Chroma C and the angle is the hue h° or colour shade. In this colour space the delta values of hue and Chroma can be reviewed to describe the colour travel.

In accordance with the present invention, it is preferred that the delta a/b is at least 15, wherein the delta a/b is determined according to the equation delta a/b=((a[15°]−a[110°])$^2$+(b[15°]−b[110°])$^2$)$^{1/2}$, wherein a[15°] is the a-value of the L*a*b* colour space measured at an observation value of 15°, a[110°] is the a-value measured at an observation value of 110°, b[15°] is the b-value of the L*a*b* colour space measured at an observation value of 15° and b[110°] is the b-value measured at an observation value of 110°, wherein the measurement is performed by irradiating in a dark environment standardized light type onto the system at an angle of incident of 45° with respect to the horizontal direction, wherein the angle of reflection of 135° with respect to the horizontal direction is defined as an observation angle of 0°. The observation angles can be seen in FIG. 2. The higher the numeric value of delta a/b, the higher the flip-flop effect.

In the above embodiment, the delta a/b between the measurement at 15° and 110° was chosen as a means to describe the colour travel. However, in other embodiments other angles might also be suitable to describe the flip-flop effect.

In accordance with a particularly preferred embodiment of the present invention, the delta a/b measured as set out above is at least 30 and more preferably at least 38.

Alternatively to the aforementioned delta a/b or in addition to the aforementioned delta a/b, the system in accordance with the present invention may have a delta L of at least 10, wherein the delta L is determined according to the equation delta L=|L[15°]−L[110°]| (| | meaning the absolute difference of both values), wherein L[15°] is the L-value of the L*a*b* colour space measured at an observation value of 15° and L[110°] is the L-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°.

In accordance with a particularly preferred embodiment of the present invention, the delta L measured as set out above is at least 20 and more preferably at least 30.

Alternatively to the aforementioned delta a/b and/or delta L, or in addition to the aforementioned delta a/b and/or delta L, the system in accordance with the present invention may have a delta h° of at least 15, wherein the delta h° is determined according to the equation delta h°=|h°[15°]−h°[110°]|(| | meaning the absolute difference of both values), wherein h°[15°] is the h°-value of the HCL colour space measured at an observation value of 15° and h°[110°] is the h°-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°.

In accordance with a particular preferred embodiment of the present invention, the delta h° is at least 30.

As indicated above, if present, the lower layer a) may be the substrate, such as a film, a paper or the like, or the lower layer a) may be arranged on the substrate, wherein the lower layer a) is for instance an ink, enamel, a coating or a lacquer. If the lower layer a) is not present, the lowest of the at least one first colour layer b) may be directly arranged on the substrate or may even form the substrate, such as if the at least one first colour layer b) is a plastic panel, glass or ceramic. Independently, from whether the lower layer a) is the substrate or whether the lower layer a) or the lowest of the at least one first colour layer b) is arranged on the substrate, the substrate may be any material, onto which the lowest layer of the system may be applied. For instance, the substrate may be a material being selected from the group consisting of films, metals, glazings, papers, cardboards, cartons, glasses, woods, textiles, nonwovens, silicones, ceramics, minerals, labels, rubbers and arbitrary combinations of two or more of the aforementioned materials.

As further set out above, in accordance with a particularly preferred embodiment of the present invention, the system is an ink system, a coating or a lacquer system. In the case of an ink system, any known printing technique may be used, such as offset, lithography, intaglio printing, flexographic printing, gravure printing, screen printing, digital printing, inkjet printing, pad printing, transfer printing, letter printing and the like. In the case of a lacquer system, any known application technique be used, such as electrostatic spray coating, air and airless electrostatic systems, dip coating, electrophoresis, anodic electrodeposition (anaphoresis), cathodic electrodeposition (cataphoresis), autophoresis, flooding, casting, drum coating, spin coating, intaglio coating, rolling, coil coating, powder coating, whirlsintering, flame spraying or electrostatic powder spraying.

Moreover, the present invention relates to the use of a system and preferably an ink, a coating or lacquer system according to the present invention for coating and in particular printing or spraying a substrate. Such systems can be used in automotive surfaces (indoor and outdoor), on computer cases, in passports, banknotes, notes, food-packaging, journals, beer cans, clothings, furnitures, floor panels, wall papers, cosmetic packagings, labels for spare parts, security features in general, mobile phone cases or on any architectural surface.

In accordance with a second aspect of the present invention, the present invention relates to a system comprising:

b) at least one first colour layer containing a dye and/or pigment, c) on the at least one first colour layer an effect layer containing at least one effect pigment, and d) on the effect layer at least one second colour layer containing a dye and/or pigment, wherein each of the at least one first colour layer and of the at least one second colour layer contains a dye and/or pigment being no effect pigment, wherein the at least one dye and/or at least one pigment included in the at least one first colour layer is different from the at least one dye and/or at least one pigment included in the at least one second colour layer, and wherein, at least if the at least one first colour layer has a sum of reflectance and scattering of less than 40%, the system further comprises:

a) below the at least one first colour layer a lower layer containing a pigment and having a sum of reflectance and scattering of at least 40%, wherein:

i) the delta a/b of the system is at least 15, wherein the delta a/b is determined according to the equation delta $a/b=((a[15°]-a[110°])^2+(b[15°]-b[110°])^2)^{1/2}$, wherein $a[15°]$ is the a-value of the L*a*b* colour space measured at an observation value of 15°, $a[110°]$ is the a-value measured at an observation value of 110°, $b[15°]$ is the b-value measured at an observation value of 15° and $b[110°]$ is the b-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°, and/or ii) the delta L of the system is at least 10, wherein the delta L is determined according to the equation delta $L=|L[15°]-L[110°]|$, wherein $L[15°]$ is the L-value measured at an observation value of 15° and $L[110°]$ is the L-value of the L*a*b* colour space measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°, and/or iii) the delta h° of the system is at least 15, wherein the delta h° is determined according to the equation delta $h°=|h°[15°]-h°[110°]|$, wherein $h°[15°]$ is the h°-value measured at an observation value of 15° and $h°[110]$ is the h°-value measured of the HCL colour space at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°, and wherein the system preferably does not contain any interference pigment.

All features disclosed above as preferred and in particular all features disclosed above as preferred concerning the nature and composition of the layers and its components are also preferred for this second aspect of the present invention. In particular, any of the layers a), b), c) and d) may be composed as described above.

Subsequently, the present invention is described by means of illustrating, but not limiting figures, wherein:

FIG. 3 shows the results of angle dependent colour measurements of four different systems in accordance with one embodiment of the present invention.

FIG. 4*a, b* show sample holders, which are suitable for fixing longitudinal sections or cross-sectional sections of a system in accordance with the present invention or of a layer thereof for SEM analysis for determining the particle length, particle width and particle thickness.

FIG. 4*c* shows an exemplary schematic pigment particle showing the particle length and particle width.

FIG. 5*a,b* show the principle of the determination of the average particle area ratio of a layer of the system in accordance with the present invention.

FIG. 6 shows the principle of the determination of the reflectance and scattering of a layer of the system in accordance with the present invention.

Figure 1:
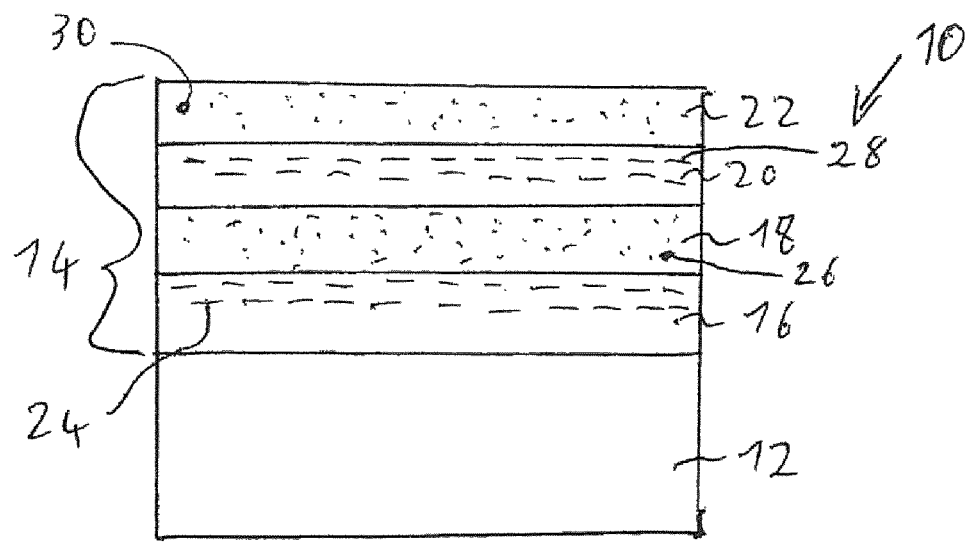
FIG. 1 shows an object comprising a substrate, which is coated with an ink system in accordance with one embodiment of the present invention.

FIG. 1 shows a system 10, which comprises a substrate 12, which is coated with an ink sequence 14 in accordance with one embodiment of the present invention. The ink sequence 14 comprises from the bottom up a lower layer 16, a first colour layer 18, an effect layer 20 and a second colour layer 22. The lower layer 16 contains white pigment 24 preferably consisting of titanium oxide having an average diameter of 0.1 to 50 μm in a concentration of about 30 to 90% by weight of white pigment based on the total weight of the dried lower layer 16. Moreover, the first colour layer 18 contains about 0.001 to 5% by weight of dye 26 and/or about 0.1 to 50% of pigment, based on the total weight of the dry first colour layer 18, whereas the effect layer 20 includes 10 to 70% by weight of metallic effect pigment, e.g. platelet-shaped aluminium effect particles, 28 consisting of aluminium having an average particle length of about 10 μm, an average particle width of about 5 μm, an average thickness of about 0.5 μm and thus a first aspect ratio of 2 and a second aspect ratio of 20, based on the total weight of the dried effect layer 20 and the second colour layer 22 contains about 0.001 to 5% by weight of dye 30 and/or 0.1 to 50% of pigment based on the total weight of the dried second colour layer 22.

Figure 2:
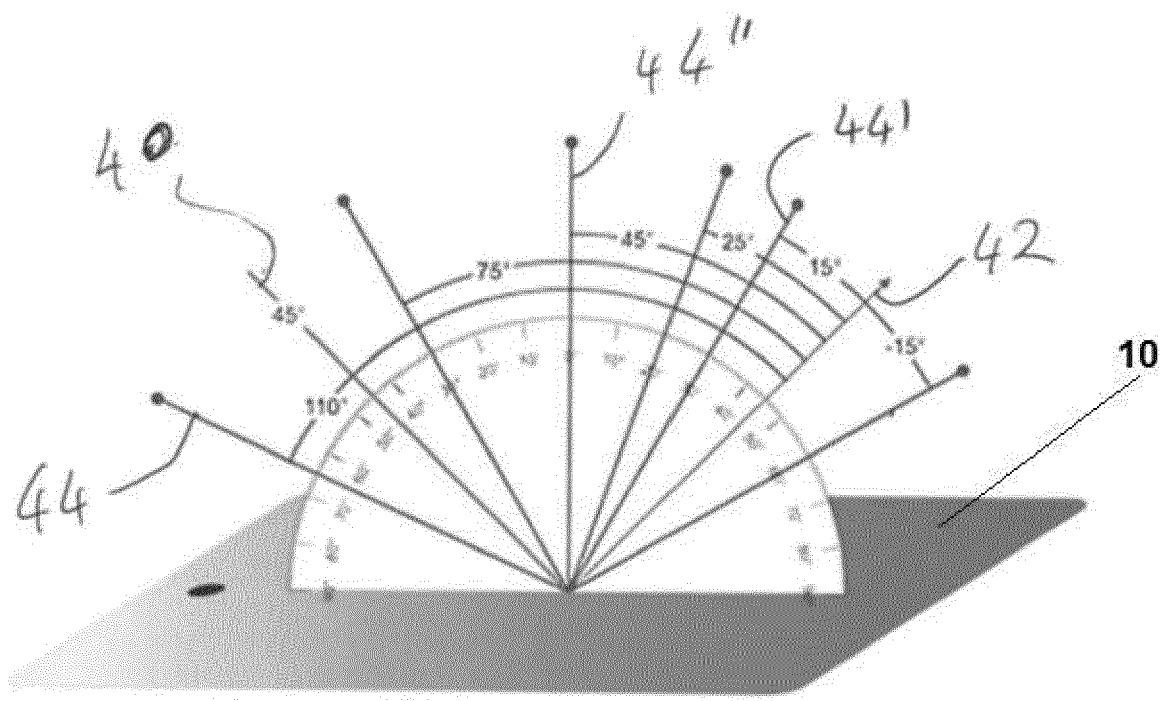
FIG. 2 shows schematically a method for measuring the angle dependent colour measurement of a system in accordance with one embodiment of the present invention.

FIG. 2 shows schematically a method for measuring the angle dependent colour appearance of a system in accordance with one embodiment of the present invention. In a dark environment, a visible light beam 40 with an adjusted intensity and wavelength range is irradiated onto a system 10 as described for instance with regard to FIG. 1 at an angle of 45° with respect to the horizontal direction. Since the angle of incidence with regard to the horizontal direction is the same as the angle of reflection 42 of the irradiated light beam, the angle of reflection 42 is 135° with respect to the horizontal direction. This angle of reflection 42 is defined for the measurement of the angle dependent colour appearance of the system in accordance with the present invention as an observation angle of 0°. In order to measure the angle dependent colour appearance of the system 10, the sum of reflectance and scattering is measured at different observation angles 44, 44', 44", for instance—as shown in FIG. 2—at observation angles of −15°, 15°, 25°, 45°, 75° and 110°. Of course, it is also possible to measure the colour appearance at more than six different observation angles or at less than six different observation angles, such as at five different observation angles, such as at observation angles of 15°, 25°, 45°, 75° and 110°. For these measurements, for example a Byk mac i instrument from Byk Garnder, Geretsried, Germany can be used, with D50 light incidence and a six angle measurement at the observation angles describes above. It is most suitable to measure rectangular samples with a minimum width of 2 cm and a minimum length of 5 cm. It is especially preferred that at least 10 samples are measured, even more preferred is the measurement of 100 or even 600 samples.

FIG. 3 shows the results of angle dependent colour measurements of four different systems in accordance with one embodiment of the present invention. The angle dependent colour measurements of the four different systems have been performed as described above with regard to FIG. 2 at observation angles of −15°, 15°, 25°, 45°, 75° and 110°. At each observation angle, the a-value as well as the b-value of each system have been determined. The respective values are plotted in FIG. 3 for any of the four systems, wherein the largest triangle of each graph represents the value measured at an observation angle of −15°. The further markers in each graph starting from the largest triangle represent the respective values determined at observation angles of 15°, 25°, 45°, 75° and 110°. The horizontal axis of FIG. 3 shows the measured a-values, whereas the vertical axis of FIG. 3 shows the measured b-values. As it can be seen from FIG. 3, the a-values and b-values of all four samples differ depending of the observation angle at which they have been determined. This shows, that all four systems showed a flip-flop effect.

FIGS. 4a and 4b show sample holders, which are suitable for fixing longitudinal sections or cross-sectional sections, respectively, of a system in accordance with the present invention or of a layer thereof for SEM analysis for determining the particle length, particle width and particle thickness. The sample holder shown in FIG. 4a is suitable for longitudinal sections of a layer or a system (for frontal view), whereas the sample holder shown in FIG. 4b is suitable for cross-sectional sections of a layer or a system. The sections are placed onto the respective sample holder area as shown by the blue arrow.

FIG. 4c shows an exemplary schematic pigment particle 46 showing the particle length 48 and particle width 50. The particle length 48 is the longest extension of the particle 46, whereas the particle width 50 is defined in this connection as the longest extension of the particle 46 in the direction being perpendicular to the particle length 48. The particle thickness is the shortest extension of the particle 46 in the direction being perpendicular to the two-dimensional plane being defined by the particle length 48 and the particle width 50, i.e. the extension of the particle perpendicular to the paper plane.

FIGS. 5a and 5b show the principle of the determination of the average particle area ratio of a layer of the system in accordance with the present invention by SEM from a longitudinal section of the concerned layer of the system being prepared as described above. The particles 46 are colored with the software tool "ParticleMetric" as shown in FIG. 5a and then the sum of the area in the longitudinal section which is covered by particles 46 as shown in FIG. 5b is evaluated and divided by the total area of the longitudinal section analyzed by scanning electron microscopy so as to obtain the average particle area ratio in percent.

FIG. 6 shows the principle of the determination of the reflectance and scattering of a layer of the system in accordance with the present invention. A piece of the prepared layer, such as a longitudinal section thereof or the layer itself, having for instance an area of 10 cm$^2$ is cut out of the system and placed in the measurement apparatus, which is preferably the Haze-Gloss instrument from Byk Garnder, Geretsried, Germany. Norm light D65 shown by the reference number 52 is irradiated in defined angle β of 20° from the vertical direction onto the surface of the layer 54 to be analyzed and the reflected (which corresponds to gloss 56, as described in DIN 67530) as well as the scattered light (which corresponds to haze 58) is detected by a sensor 60.

Subsequently, the present invention is described by means of illustrating, but not limiting examples.

EXAMPLE 1

Solvent-based: flexographic inks based on nitrocellulose and polyurethane (NC/PU) have been printed on 30 μm thick foils of oriented polypropylene (OPP). The following inks from the hubergroup Deutschland. GmbH: 61GU336812 (Yellow; abbreviated subsequently as Y), 62GU336816 (Magenta; abbreviated subsequently as M), 63GU336821 (Cyan; abbreviated subsequently as C), 69GU336827 (Black; abbreviated subsequently as Bk), 77GU289376 (White; abbreviated subsequently as W) and 76GU318960 (Silver; abbreviated subsequently as S) were printed onto the foils at a print viscosity 20s in a DIN 4 cup. The inks have been diluted with ethanol/ethyl acetate 9:1. The pigment-binder ratio in the dry ink film was 0.9:1 to 1.5:1 for the inks Y, M, C and Bk, 1:0.3 for W and 0.9:1 for S, wherein between 0.7 and 1.5 g/m$^2$ of dry ink (for each ink) have been applied. The following ink sequences have been printed, from the bottom up:

| System | Layer 1 | Layer 2 | Layer 3 | Layer 4 | Layer 5 | Layer 6 |
|---|---|---|---|---|---|---|
| 1 | White | Yellow | Silver | Magenta | Cyan | Black |
| 2 | White | Yellow | Silver | — | Magenta | Black |

-continued

| System | Layer 1 | Layer 2 | Layer 3 | Layer 4 | Layer 5 | Layer 6 |
|---|---|---|---|---|---|---|
| 3 | White | Magenta | Silver | Yellow | Cyan | Black |
| 4 | White | Magenta | Silver | — | Yellow | Black |
| 5 | White | Cyan | Silver | Yellow | Magenta | Black |
| 6 | White | Cyan | Silver | Yellow | White | Black |

The layers, which correspond to the respective print forms, were as follows:

|  | Layer 1 | Layer 2 | Layer 3 | Layer 4 | Layer 5 | Layer 6 |
|---|---|---|---|---|---|---|
| Lines/cm | 360 | 360 | 360 | 220 | 360 | 120 |
| Ink volume [cm$^3$/m$^2$] | 4.0 | 3.9 | 3.9 | 8.0 | 3.9 | 16.4 |

The flip-flop effects for each system were measured with a Byk mac I instrument. A five angle measurement for a/b travel evaluation was carried out at observation angles of −15°/15°/25°/45°/75°/110°. In order to assess the degree of the flip-flop effect for each system, the a- and b-values of the L*a*b* colour space were measured at observation angles of 15° and of 110° and therefrom the ratio delta a/b has been determined according to the following equation:

Delta $a/b = ((a[15°] - a[110°])^2 + (b[15°] - b[110°])^2)^{1/2}$

The higher the numeric value of delta at, the higher the flip-flop effect.

For seven different trials, the following results were obtained:

| | Colour/Ink Coverage of Layer No. | | | | | | Delta a/b 15°/110° |
|---|---|---|---|---|---|---|---|
| | 1 | 2 | 3 | 4 | 5 | 6 | |
| Trial 1 (Coverage) | White 100 | Yellow 100 | Silver 90 | Magenta 10 | Cyan 30 | Black 0 | 50.9 |
| Trial 2 (Coverage) | White 100 | Magenta 100 | Silver 100 | Yellow 10 | Cyan 50 | Black 0 | 41.1 |
| Trial 3 (Coverage) | White 100 | Cyan 90 | Silver 80 | Yellow 40 | Magenta 20 | Black 0 | 38.9 |
| Trial 4 (Coverage) | White 100 | Cyan 90 | Silver 100 | Yellow 40 | Magenta 0 | Black 10 | 38.9 |
| Trial 5 (Coverage) | White 100 | Yellow 70 | Silver 90 | Magenta 30 | Cyan 20 | Black 20 | 19.9 |
| Trial 6 (Coverage) | White 100 | Magenta 70 | Silver 90 | Yellow 20 | Cyan 10 | Black 30 | 16.6 |
| Trial 7 (Coverage) | White 100 | Cyan 70 | Silver 100 | Yellow 10 | Magenta 10 | Black 20 | 17.0 |

Thus, the highest colour flip-flop effects have been achieved for 90 to 100% ink coverage for the colour ink printed between the white and silver layers, for 80 to 100% ink coverage for the silver layer, for 0 to 10% coverage for the optional black layer and sum of ink coverage of 40 to 60% for all inks printed on the side above the silver, i.e. effect layer.

In an additional trial, the colours Y, M and C have been extended by 100% with extender 60GU319987, resulting in pigment binder ratios of 0.9:2 to 1.5:2. Also by using these colours, the flip-flop effect was observed.

EXAMPLE 2

In another trial, solvent-based inks based on NC/PU have been tested in gravure printing: Cyan 63GU514973, Magenta 62GU514969, Yellow 61GU515076, Black 69GU515074, White 67GU515182, Silver 66GU515184, and Extender 70GU504288 (hubergroup Deutschland GmbH).

Cyan and Magenta were extended by 120%. Yellow, Silver and white were printed without extender. The inks have again been diluted to 20s in a DIN 4 cup with ethanol/ethylacetate 9:1. The inks were applied on corona treated OPP film with a Roto Hand Proofer (Pamarco). The following ink sequences have been investigated from bottom to up:

W-Y-S-M-C-Bk, W-S-Y-M-C, W-Y-S-M-Bk and W-S-Y-M-C-Bk.

W is the abbreviation for White, Y for Yellow, S for Silver, M for Magenta, C for Cyan and Bk for Black.

In this trial it was observed that inks with a higher pigmentation showed less visible flip-flop effect, indicating that transparency was not sufficient at the ink film thickness achieved with gravure printing with standard pigment content. Between 0.7 and 1.5 g/m$^2$ of ink (for each ink) have been applied. The pigment binder ratio was 1.5:2 to 3:2 for Yellow, Cyan, Magenta and Silver, and 2:3 for White. Delta alb 15°/110° values of up to 40 have been achieved when yellow was printed between white and silver, and the other inks above or before silver.

EXAMPLE 3

In a third trial the inks from example 2 have been applied using a K-printing-proofer 100 I/cm (RK Print Coat Instruments). The same inks and ink sequences have been applied as in example 2, resulting in an ink film of 0.13 to 0.8 g/m$^2$. It was observed that the inks had to be further extended by another 100% to observe an optimal flip-flop effect, resulting in a pigment binder ratio of 1:2 to 1:6 for Yellow, 1:8 to 1:10 for Cyan and Magenta, 1:1.5 for Silver and 1:0.7 for White. A delta a/b 15/110° of 27 has been achieved with the ink sequence white, yellow, silver, cyan, and of 35 for the ink sequence white, yellow, silver, magenta.

In addition, the present invention refers to the following feature combinations or aspects, respectively. Each of the following aspects may be combined with the aforementioned embodiments.

EXAMPLE 4

Solvent-based flexographic inks based on NC/PU have been printed on 30 μm thick foils of white oriented polypropylene (OPP). The following inks from the hubergroup Deutschland GmbH: 61GU336812 (Yellow; abbreviated subsequently as Y), 62GU336816 (Magenta; abbreviated subsequently as M), 63GU336821 (Cyan; abbreviated subsequently as C) and 76GU318960 (Silver; abbreviated subsequently as S) were printed onto the foils at a print viscosity 20s in a DIN 4 cup. The inks have been diluted with ethanol/ethyl acetate 9:1. The pigment-binder ratio in the dry ink film was 0.9:1 to 1.5:1 for the inks Y, M and C and 0.9:1 for S, wherein between 0.7 and 1.5 g/m$^2$ of dry ink (for each ink) have been applied. The following ink sequences have been printed, from the bottom up:

| Layer 1 | Layer 2 | Layer 3 | Layer 4 | Layer 5 | Layer 6 | Layer 7 |
|---------|---------|---------|---------|---------|---------|---------|
| Yellow  | Magenta | Cyan    | Silver  | Yellow  | Magenta | Cyan    |

|  | Layer 1 | Layer 2 | Layer 3 | Layer 4 | Layer 5 | Layer 6 | Layer 7 |
|---|---|---|---|---|---|---|---|
| Lines/cm | 360 | 360 | 360 | 220 | 360 | 360 | 360 |
| Ink volume [cm³/m²] | 3.9 | 3.9 | 3.9 | 8.0 | 3.5 | 3.5 | 3.5 |

The flip-flop effects for each system were measured with a Byk mac I instrument. A five angle measurement for a/b travel evaluation was carried out at observation angles of +15°/15°/25°/45°/75°/110°. In order to assess the degree of the flip-flop effect for each system, the h°-values of the HCL colour space were measured at observation angles of 15° and of 110° and therefrom the ratio delta h° has been determined according to the following equation:

$$\Delta h° = |h°[110°] - h°[15°]|,$$

which equals the absolute difference between these two h° values.

For different ink sequences and ink coverages the following numbers were obtained:

| Colours below silver = Layer b | | | | Colours above silver = Layer d | | | Sum of | | | | | | | Delta |
|---|---|---|---|---|---|---|---|---|---|---|---|---|---|---|
| Y | M | C | Silver | Y | M | C | layer d | h-15P | h15P | h25P | h45P | h75P | h110P | h(15/110) |
| 50 | 0 | 0 | 33 | 0 | 67 | 33 | 100 | 325.5 | 328 | 333 | 357 | 6.45 | 8.71 | 41 |
| 50 | 0 | 0 | 33 | 0 | 67 | 0 | 67 | 0.34 | 3.61 | 5.88 | 18.9 | 23.6 | 25.05 | 21 |
| 50 | 0 | 0 | 33 | 0 | 33 | 0 | 33 | 19.53 | 26.3 | 37 | 50.2 | 53.4 | 54.31 | 28 |
| 50 | 0 | 0 | 33 | 0 | 0 | 67 | 67 | 212.3 | 214 | 202 | 183 | 178 | 178.8 | 35 |
| 0 | 50 | 0 | 33 | 0 | 0 | 67 | 67 | 238.8 | 240 | 249 | 262 | 266 | 266.7 | 26 |
| 0 | 50 | 0 | 33 | 33 | 0 | 0 | 33 | 66.94 | 71.7 | 55.8 | 39.9 | 35.2 | 34.65 | 37 |
| 0 | 50 | 0 | 33 | 67 | 0 | 33 | 100 | 114.1 | 112 | 107 | 91.9 | 83.1 | 80.57 | 31 |
| 0 | 50 | 0 | 33 | 0 | 0 | 33 | 33 | 254.1 | 255 | 270 | 294 | 300 | 301 | 46 |
| 0 | 0 | 50 | 33 | 0 | 33 | 0 | 33 | 312.8 | 310 | 293 | 275 | 269 | 267.8 | 42 |
| 0 | 0 | 50 | 33 | 67 | 0 | 0 | 67 | 105 | 108 | 116 | 131 | 137 | 138.5 | 30 |
| 0 | 0 | 50 | 33 | 67 | 33 | 0 | 100 | 78.98 | 79.1 | 85.3 | 104 | 115 | 117 | 38 |
| 0 | 0 | 50 | 33 | 33 | 67 | 0 | 100 | 21.64 | 13.8 | 1.4 | 342 | 331 | 328.8 | 45 |
| 50 | 0 | 0 | 67 | 0 | 67 | 0 | 67 | 3.28 | 0.81 | 6.15 | 19.2 | 24 | 25.87 | 25 |
| 50 | 0 | 0 | 67 | 0 | 0 | 100 | 100 | 233.6 | 216 | 211 | 199 | 194 | 194.5 | 21 |
| 50 | 0 | 0 | 67 | 0 | 67 | 33 | 100 | 330.5 | 333 | 322 | 345 | 359 | 1.84 | 29 |
| 50 | 0 | 0 | 67 | 0 | 33 | 0 | 33 | 8.11 | 12.6 | 22.6 | 46.9 | 54.2 | 56.02 | 43 |
| 100 | 0 | 0 | 67 | 0 | 0 | 33 | 33 | 206.4 | 198 | 162 | 124 | 116 | 114.5 | 84 |
| 100 | 0 | 0 | 67 | 0 | 33 | 100 | 133 | 232.8 | 227 | 219 | 190 | 173 | 170.8 | 56 |
| 100 | 0 | 0 | 67 | 0 | 0 | 67 | 67 | 216.5 | 213 | 196 | 158 | 142 | 140.2 | 73 |
| 100 | 0 | 0 | 67 | 100 | 0 | 0 | 100 | 357.3 | 355 | 0.55 | 20 | 31.3 | 34.2 | 39 |
| 0 | 50 | 50 | 67 | 33 | 0 | 0 | 33 | 97.25 | 104 | 102 | 116 | 172 | 202 | 98 |
| 0 | 100 | 0 | 67 | 33 | 0 | 0 | 33 | 78.18 | 71.2 | 51.6 | 25.2 | 17.5 | 17.39 | 54 |
| 0 | 100 | 0 | 67 | 100 | 0 | 67 | 167 | 128.9 | 127 | 126 | 116 | 98.4 | 89.77 | 37 |
| 0 | 100 | 0 | 67 | 0 | 0 | 100 | 100 | 230 | 229 | 233 | 255 | 277 | 282.3 | 53 |
| 0 | 100 | 50 | 67 | 67 | 0 | 0 | 67 | 94.68 | 95.2 | 91.8 | 75.9 | 51.7 | 45.22 | 50 |
| 0 | 100 | 0 | 67 | 67 | 0 | 33 | 100 | 109.3 | 111 | 101 | 55.6 | 28.4 | 25.14 | 86 |
| 0 | 100 | 0 | 67 | 0 | 0 | 67 | 67 | 235.5 | 237 | 251 | 285 | 302 | 304.9 | 67 |
| 0 | 100 | 0 | 67 | 67 | 0 | 0 | 67 | 83.74 | 80.5 | 69.1 | 45.2 | 34.8 | 33.85 | 47 |
| 0 | 50 | 100 | 67 | 67 | 0 | 0 | 67 | 101.1 | 101 | 107 | 133 | 161 | 166.6 | 65 |
| 0 | 0 | 100 | 67 | 67 | 33 | 0 | 100 | 86.42 | 89.7 | 105 | 150 | 170 | 173.2 | 84 |
| 0 | 0 | 100 | 67 | 0 | 67 | 0 | 67 | 326.6 | 330 | 315 | 291 | 278 | 275.3 | 54 |
| 0 | 0 | 100 | 100 | 67 | 0 | 0 | 67 | 99.46 | 101 | 111 | 141 | 161 | 164.2 | 63 |
| 0 | 0 | 100 | 100 | 100 | 67 | 0 | 167 | 64.15 | 66 | 64 | 72.5 | 95 | 104.8 | 39 |
| 0 | 100 | 0 | 100 | 0 | 0 | 33 | 33 | 254.2 | 248 | 254 | 306 | 328 | 332.4 | 85 |
| 0 | 50 | 0 | 100 | 0 | 0 | 100 | 100 | 232.9 | 228 | 235 | 245 | 250 | 250.5 | 22 |
| 0 | 0 | 100 | 100 | 33 | 0 | 0 | 33 | 110.6 | 114 | 137 | 182 | 194 | 196.8 | 83 |
| 0 | 0 | 50 | 100 | 33 | 67 | 0 | 100 | 16.19 | 21.9 | 12.4 | 2.18 | 350 | 347.4 | 35 |
| 0 | 100 | 0 | 100 | 100 | 0 | 0 | 100 | 89.93 | 87.5 | 82.8 | 68.4 | 57.8 | 56.19 | 31 |
| 0 | 100 | 0 | 100 | 67 | 0 | 100 | 167 | 187.3 | 186 | 188 | 197 | 212 | 217.6 | 32 |
| 0 | 100 | 0 | 100 | 33 | 0 | 100 | 133 | 210.8 | 210 | 212 | 228 | 250 | 256.9 | 47 |
| 0 | 100 | 100 | 100 | 100 | 0 | 0 | 100 | 95.19 | 94.7 | 96.7 | 104 | 117 | 119 | 24 |
| 0 | 0 | 100 | 100 | 33 | 100 | 0 | 133 | 5.29 | 29.4 | 2.39 | 350 | 332 | 325.5 | 64 |
| 0 | 100 | 0 | 100 | 100 | 0 | 0 | 100 | 89.03 | 87.4 | 83 | 68.3 | 56.9 | 54.77 | 33 |
| 0 | 50 | 0 | 100 | 33 | 0 | 67 | 100 | 200.5 | 199 | 202 | 211 | 219 | 222.2 | 23 |
| 0 | 0 | 100 | 100 | 100 | 0 | 0 | 100 | 97.45 | 97.1 | 103 | 123 | 141 | 144.1 | 47 |
| 0 | 0 | 50 | 100 | 100 | 33 | 0 | 133 | 82.86 | 83 | 85.6 | 94.6 | 102 | 102.9 | 20 |
| 0 | 0 | 50 | 100 | 0 | 67 | 0 | 67 | 338.6 | 336 | 330 | 318 | 310 | 307.9 | 28 |
| 0 | 50 | 0 | 100 | 67 | 0 | 0 | 67 | 89.8 | 86.8 | 81.4 | 70.2 | 64.7 | 63.51 | 23 |
| 0 | 100 | 0 | 100 | 0 | 0 | 100 | 100 | 227.8 | 227 | 233 | 254 | 277 | 282.3 | 55 |
| 0 | 0 | 100 | 100 | 0 | 33 | 0 | 33 | 319.3 | 315 | 295 | 267 | 257 | 255.7 | 59 |
| 0 | 0 | 50 | 100 | 100 | 0 | 0 | 100 | 96.58 | 96.5 | 101 | 114 | 122 | 122.7 | 26 |
| 0 | 0 | 100 | 100 | 0 | 100 | 0 | 100 | 341.6 | 341 | 337 | 326 | 315 | 312.5 | 29 |

Remark: The h° values are polar coordinates of between 0 and 360°.

EXAMPLE 5

In this experiment automotive coatings have been applied to sheet metal substrates. The following recipes based on standard products from the Nexa Autocolor Aquabase colour mixing system have been used:

| Compound | Red | Blue | Green | Silver, fine | silver, medium | Silver, coarse |
|---|---|---|---|---|---|---|
| Clear P990-8999 | | 50 | 50 | 40 | 40 | 40 |
| Red P993-8941 | 30 | | | | | |
| Blue P990-8957 | | 2 | | | | |
| Transparent Green P991-8952 | | | 2 | | | |
| Extra fine Aluminium P998-8985 | | | | | 2 | |

*-continued*

| Compound | Red | Blue | Green | Silver, fine | silver, medium | Silver, coarse |
|---|---|---|---|---|---|---|
| Medium bright Aluminium P-998-8988 | | | | | 2 | |
| Extra coarse Aluminium P998-8989 | | | | | | 2 |
| Wasser | 2 | 3 | 3 | 8 | 8 | 8 |
| Sum | 32 | 55 | 55 | 50 | 50 | 50 |
| Pigment binder ratio | 1:2 | 1:13 | 1:13 | 1:5 | 1:5 | 1:5 |
| $D_{90}/D_{10}$-Particel size [μm] | | | | 5-25 | 10-40 | 25-75 |

D10 and D90 are the intercepts for 10% and 90% of the cumulative mass of the particles.

The lacquers have been applied using a Sata Jet 5000, pressure 1.6 bar for application of first colour Red, 1.9 bar for allocation of Silver types, Blue and Green.

The following layer sequences have been applied:

| First layer | Second Layer | Third Layer |
|---|---|---|
| Red | Silver, fine | Blue |
| Red | Silver, medium | Blue |
| Red | Silver, coarse | Blue |
| Red | Silver, fine | Green |
| Red | Silver, medium | Green |
| Red | Silver, coarse | Green |

In a last step a clear coat, solvent based product from Nexa, was applied on the substrates.

The coatings had the following thicknesses:

Red: was applied twice, final red layer thickness was about 30 μm

Silver: was applied once/twice, final silver layer thickness was about 15/30 μm

Blue/Green: was applied once/twice, final blue/green layer thickness was about 20/40 μm Clearcoat: was applied twice, final clear coat layer thickness was 90-100 μm. As clearcoat, 2K HS Plus Clearcoat P190-6570 (2 parts) plus hardener P210-8645 (1 part) both from Nexa Autocolor, from PPG Industries, Ohio was used.

The coated substrates were measured with a Byk mac I instrument as described above, some exemplary measurement results are listed in the following table:

| 1st colour | Silver | 2nd colour | L* -15 | 15 | 25 | 45 | 75 | 110 | Δ L | h -15 | 15 | 25 | 45 | 75 | 110 | Δ h° |
|---|---|---|---|---|---|---|---|---|---|---|---|---|---|---|---|---|
| Red, twice | fine, once | green, once | 67 | 61 | 48 | 32 | 26 | 23 | 38 | 109 | 88 | 51 | 33 | 35 | 35 | 53 |
| Red, twice | fine, twice | green, once | 80 | 74 | 58 | 38 | 28 | 24 | 50 | 136 | 127 | 94 | 39 | 32 | 32 | 95 |
| Red, twice | medium, once | green, twice | 74 | 65 | 41 | 26 | 23 | 21 | 43 | 130 | 110 | 45 | 33 | 36 | 36 | 74 |
| Red, twice | medium, twice | green, twice | 96 | 85 | 56 | 30 | 23 | 21 | 64 | 146 | 143 | 108 | 32 | 31 | 31 | 111 |
| Red, twice | coarse, twice | green, twice | 53 | 46 | 29 | 23 | 22 | 20 | 26 | 102 | 71 | 36 | 36 | 37 | 36 | 35 |
| Red, twice | coarse, twice | green, once | 57 | 50 | 32 | 24 | 24 | 22 | 28 | 89 | 61 | 34 | 37 | 38 | 38 | 23 |
| Red, twice | fine, once | blue, once | 56 | 52 | 38 | 22 | 16 | 13 | 38 | 219 | 226 | 266 | 356 | 16 | 18 | 152 |
| Red, twice | fine, twice | blue, once | 73 | 68 | 50 | 28 | 18 | 14 | 54 | 216 | 220 | 238 | 326 | 6 | 10 | 150 |
| Red, twice | medium, once | blue, once | 52 | 47 | 33 | 18 | 13 | 11 | 36 | 215 | 221 | 256 | 347 | 7 | 6 | 145 |
| Red, twice | medium, twice | blue, once | 48 | 44 | 31 | 16 | 11 | 9 | 35 | 215 | 220 | 245 | 327 | 354 | 353 | 133 |
| Red, twice | coarse, twice | blue, once | 37 | 33 | 20 | 13 | 11 | 9 | 24 | 222 | 235 | 321 | 0 | 9 | 5 | 130 |
| Red, twice | coarse, twice | blue, twice | 37 | 32 | 19 | 12 | 10 | 8 | 24 | 221 | 235 | 313 | 355 | 4 | 359 | 124 |

Δ L = Delta L = |L[15°] − L[110°]|
Δ h° = Delta h° = |h°[15°] − h°[110°]|

Colour flop was observed for all investigated combinations. The use of small and medium size aluminium pigment particle showed a more intensive flip-flop effect.

When bigger aluminium particles are used the colour flop is pretty good visible on the particles themselves, but it cannot be properly measured and evaluated.

Further aspects of the present invention are described below.

Aspect 1. A system comprising:
 a) a lower layer (16) containing white pigment (24),
 b) on the lower layer (16) at least one first colour layer (18) containing a dye (24) and/or pigment being different from the white pigment (24) contained in the lower layer (16) and being no metallic pigment,
 c) on the at least one first colour layer (18) a metallic layer (20) containing at least one metallic pigment (28) and
 d) on the metallic layer (20) at least one second colour layer (22) containing a dye (30) and/or pigment being different from the white pigment (24) contained in the lower layer (16) and being no metal effect pigment.

Aspect 2. The system in accordance with aspect 1, wherein at least at an angle of 0 to 45° with respect to the horizontal direction the colour shade of the visible light (34) being reflected and scattered by the metallic layer (20) is different to the colour shade of the visible light (38) being reflected by the lower layer (16).

Aspect 3. The system in accordance with aspect 1 or 2, wherein the white pigment (24) included in the lower layer (16) is selected from the group consisting of titanium dioxide, barium sulfate, zinc oxide, zinc sulfide, lead carbonate, calcium carbonate, aluminium oxide, aluminium silicate and arbitrary combinations of two or more of the aforementioned substances.

Aspect 4. The system in accordance with any of the preceding aspects, wherein the lower layer (16):
i) is a foil/film and contains 0.1 to 10% by weight, preferably 0.25 to 4% by weight and more preferably 0.75 to 1.5% by weight of white pigment (24) based on the total weight of the lower layer (16), wherein the foil/film has preferably a thickness of 1 to 100 µm, more preferably of 2 to 50 µm and most preferably of 10 to 30 µm, or
ii) is a paper or cardboard and contains 0.1 to 50% by weight, preferably 1 to 10% by weight and more preferably 3 to 7% by weight of white pigment (24) based on the total weight of the lower layer (16) or
iii) is an ink and contains 10 to 90% by weight and preferably 30 to 90% by weight of white pigment (24) based on the total weight of the lower layer (16), wherein the ink has preferably a thickness of 1 to 10,000 µm.

Aspect 5. The system in accordance with any of the preceding aspects, wherein the white pigment (24) included in the lower layer (16) is titanium oxide and preferably rutile and present in the form of particles having an average $d_{50}$ particle size of 0.1 to 50 µm, preferably of 0.1 to 10 µm and more preferably of 0.2 to 0.5 µm.

Aspect 6. The system in accordance with any of the preceding aspects, wherein the metallic layer (20) is an ink having a ratio of pigment to binder in the metallic layer (20) is 0.3:1 to 2:1, preferably 0.7:1 to 2:1 and more preferably 0.7:1 to 1.8:1.

Aspect 7. The system in accordance with any of the preceding aspects, wherein the metallic pigment (28) included in the metallic layer (20) is present in the form of platelets having an average $d_{50}$ size of 2 µm to 3000 µm.

Aspect 8. The system in accordance with any of the preceding aspects, wherein the metallic layer (20) has a thickness of 0.1 to 50 µm, more preferably of 0.5 to 20 µm and most preferably of 1 to 10 µm.

Aspect 9. The system in accordance with any of the preceding aspects, wherein the ink coverage of the metallic layer (20) on the at least one first colour layer (18) is 40 to 100%, more preferably 70 to 100%, even more preferably 80 to 100% and most preferably 90 to 100%, wherein the ink coverage is the percentage of the area of the upperset of the first colour layer(s) (18), which is covered by the metallic layer (20).

Aspect 10. The system in accordance with any of the preceding aspects, wherein the dry laydown of the metallic layer (20) is 0.2 to 2 gsm, more preferably 0.3 to 1.5 gam and most preferably 0.4 to 1.2 gsm.

Aspect 11. The system in accordance with any of the preceding aspects, wherein the weight ratio of pigment to binder in the metallic layer (20) is 0.3:1 to 2:1, more preferably 0.7:1 to 2:1 and most preferably 0.7:1 to 1.8:1.

Aspect 12. The system in accordance with any of the preceding aspects, wherein any of the first colour layer (18) and of the at least one second colour layer (22) contains 0.001 to 5% by weight of at least one dye (26, 30) and/or 0.1 to 50% by weight of at least one pigment being no white pigment and no metallic pigment, based on the total dry weight of the first colour layer (18) and/or second colour layer (22).

Aspect 13. The system in accordance with any of the preceding aspects, wherein the at least one dye (26) and/or at least one pigment included in the first colour layer (18) is different from the at least one dye (30) and/or at least one pigment included in the at least one second colour layer (22).

Aspect 14. The system in accordance with any of the preceding aspects, which does not contain any interference pigment.

Aspect 15. The system in accordance with any of the preceding aspects, wherein the delta a/b is at least 15, more preferably at least 30 and most preferably at least 38, wherein the delta a/b is determined according to the equation delta $a/b=((a[15°]-a[110°])^2-(b[15°]+b[110°])^2)^{1/2}$, wherein a[15°] is the a-value measured at an observation value of 15°, a[110°] is the a-value measured at an observation value of 110°, b[15°] is the b-value measured at an observation value of 15° and b[110°] is the b-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°.

LIST OF REFERENCES

10 System/Coated object
12 Substrate
14 Ink Sequence
16 Lower layer
18 First colour layer
20 Effect layer
22 Second colour layer
24 White pigment
26 First dye
28 Platelet-shaped effect pigment
30 Second dye
40 Irradiated light beam
42 Angle of reflection of the irradiated light beam
44, 44', 44" Angle of measurement of reflectance/scattering/colour shade
46 Pigment particle
48 Particle length
50 Particle width
52 Norm light
54 Surface of layer
56 Gloss
58 Haze
60 Sensor
β Angle of incidence of norm light

The invention claimed is:
1. A system comprising:
a) at least one first colour layer (18) containing a dye (26) and/or pigment,
b) on the at least one first colour layer (18) an effect layer (20) containing at least one platelet-shaped effect pigment (28), wherein the at least one platelet-shaped effect pigment (28) is composed of particles (46) having an average length (48) of 2 to 500 µm, an average width (50) of 2 to 500 µm and an average thickness of at most 1 µm,
c) on the effect layer (20) at least one second colour layer (22) containing a dye (30) and/or pigment, wherein each of the at least one first colour layer (18) and of the at least one second colour layer (22) contains a dye (26, 30) and/or pigment being no platelet-shaped effect pigment, wherein the at least one dye (26) and/or at least one pigment included in the at least one first colour layer (18) is different from the at least one dye (30) and/or at least one pigment included in the at least one second colour layer (22), wherein, at least if the at least one first colour layer (18) has a sum of reflectance and scattering of less than 40%, the system further comprises:

d) below the at least one first colour layer (18) a lower layer (16) containing a pigment (24) and having a sum of reflectance and scattering of at least 40%, wherein the system does not contain any interference pigment, wherein the interference pigment is defined to be a pigment which produces an interference of light waves, and wherein the delta a/b is at least 15, wherein the delta a/b is determined according to the equation delta a/b=$((a[15°]-a[110°])^2+(b[15°]-b[110°])^2)^{1/2}$, wherein a[15°] is the a-value measured at an observation value of 15°, a[110°] is the a-value measured at an observation value of 110°, b[15°] is the b-value measured at an observation value of 15° and b[110°] is the b-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°.

2. The system in accordance with claim 1, wherein the at least one platelet-shaped effect pigment (28) is a platelet-shaped metal effect pigment.

3. The system in accordance with claim 2, wherein the at least one platelet-shaped effect pigment is composed of particles having an average thickness of 0.01 to at 1 μm.

4. The system in accordance with claim 2, wherein the at least one platelet-shaped effect pigment is composed of particles having a first aspect ratio of the average particle length divided by the average particle width of 1 to 20.

5. The system in accordance with claim 2, wherein the at least one platelet-shaped effect pigment is composed of particles having a second aspect ratio of the average particle length divided by the average particle thickness of 1 to 75,000.

6. The system in accordance with claim 1, wherein the at least one platelet-shaped effect pigment (28) is composed of particles (46) having an average thickness of 0.01 to at 1 μm.

7. The system in accordance with claim 6, wherein the at least one platelet-shaped effect pigment is composed of particles having a first aspect ratio of the average particle length divided by the average particle width of 1 to 20.

8. The system in accordance with claim 1, wherein the at least one platelet-shaped effect pigment (28) is composed of particles (46) having a first aspect ratio of the average particle length (48) divided by the average particle width (50) of 1 to 20.

9. The system in accordance with claim 1, wherein the at least one platelet-shaped effect pigment (28) is composed of particles (46) having a second aspect ratio of the average particle length (48) divided by the average particle thickness of 1 to 75,000.

10. The system in accordance with claim 1, wherein the average particle area ratio of the effect layer (20) is 5 to 75.

11. The system in accordance with claim 1, wherein the effect layer (20) has a thickness of 0.1 to 50 μm.

12. The system in accordance with claim 1, wherein the weight ratio of pigment to binder in the dry effect layer (20) is 0.02:1 to 2:1.

13. The system in accordance with claim 1, wherein the effect layer (20) has a sum of reflectance and scattering of 20 to 100%.

14. The system in accordance with claim 1, wherein the lower layer (16) is present and:
   i) is a film and contains 0.1 to 10% by weight of white pigment (24) based on the total weight of the lower layer (16), wherein the film has a thickness of 1 to 100 μm, or
   ii) is a paper or cardboard and contains 0.1 to 50% by weight of white pigment (24) based on the total weight of the lower layer (16) or
   iii) is an ink and contains 10 to 90% by weight of white pigment (24) based on the total weight of the dry lower layer (16), wherein the ink has a thickness of 0.5 to 100 μm or
   iv) is a coating or lacquer and contains 10 to 90% by weight of white pigment (24) based on the total weight of the dry lower layer (16), wherein the coating or lacquer has a thickness of 0.5 to 1,000 μm.

15. The system in accordance with claim 1, wherein the lower layer (16) is present and the dye (26, 30) and/or pigment included in each of the at least one first colour layer (18) and of the at least one second colour layer (22) is different from the pigment (24) contained in the lower layer (16).

16. The system in accordance with claim 1, wherein any of the at least one first colour layer (18) and of the at least one second colour layer (22) contains 0.001 to 5% by weight of at least one dye (26, 30) and/or 0.1 to 50% by weight of at least one pigment being no white pigment and no metallic pigment, based on the total dry weight of the first colour layer (18) and/or second colour layer (22).

17. The system in accordance with claim 1, wherein the at least one platelet-shaped effect pigment is composed of particles having a first aspect ratio of the average particle length divided by the average particle width of 1 to 20.

18. A system comprising:
   a) at least one first colour layer (18) containing a dye (26) and/or pigment,
   b) on the at least one first colour layer (18) an effect layer (20) containing at least one platelet-shaped effect pigment (28),
   c) on the effect layer (20) at least one second colour layer (22) containing a dye (30) and/or pigment, wherein each of the at least one first colour layer (18) and of the at least one second colour layer (22) contains a dye (26, 30) and/or pigment being no effect pigment, wherein the at least one dye (26) and/or at least one pigment included in the at least one first colour layer (18) is different from the at least one dye (30) and/or at least one pigment included in the at least one second colour layer (22), wherein, at least if the at least one first colour layer (18) has a sum of reflectance and scattering of less than 40%, the system further comprises:

d) below the at least one first colour layer (18) a lower layer (16) containing a pigment (24) and having a sum of reflectance and scattering of at least 40%, wherein:
   1) the delta L of the system is at least 10, wherein the delta L is determined according to the equation delta L=|L[15°]−L[110°]|, wherein L[15°] is the L-value measured at an observation value of 15° and L[110°] is the L-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°, and/or 2) the delta h° of the system is at least 15, wherein the delta h° is determined according to the equation delta h°=|h°[15°]−h°[110°]|, wherein h°[15°] is the h°-value measured at an observation value of 15° and h°[110°] is the h°-value measured at an observation value of 110°, wherein the measurement is performed by irradiating in a dark environment a standardized light type onto the system at an angle of incident of 45° with respect to the horizontal direction, wherein the angle of reflection of 135° with respect to the horizontal direction is defined as an observation angle of 0°, wherein the system does not contain any interference pigment, wherein the interference pigment is defined to be a pigment which produces an interference of light waves, and wherein the at least one platelet-shaped effect pigment (28) is composed of particles (46) having an average length (48) of 2 to 500 μm, an average width (50) of 2 to 500 μm and an average thickness of at most 1 μm.

\* \* \* \* \*